(12) United States Patent  (10) Patent No.: US 7,889,465 B2
Bonilla et al.  (45) Date of Patent: *Feb. 15, 2011

(54) GFCI THAT CANNOT BE RESET UNTIL WIRED CORRECTLY ON LINE SIDE AND POWER IS APPLIED

(75) Inventors: Nelson Bonilla, Winter Garden, FL (US); Joseph V. DeBartolo, Jr., N. Stoning, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/385,394

(22) Filed: Apr. 7, 2009

(65) Prior Publication Data

US 2009/0262470 A1   Oct. 22, 2009

Related U.S. Application Data

(63) Continuation of application No. 11/655,255, filed on Jan. 9, 2007, now Pat. No. 7,538,994, which is a continuation of application No. 10/434,101, filed on May 9, 2003, now Pat. No. 7,184,250.

(60) Provisional application No. 60/378,647, filed on May 9, 2002.

(51) Int. Cl.
*H02H 3/00* (2006.01)
*H02H 9/08* (2006.01)

(52) U.S. Cl. ....................................................... 361/42
(58) Field of Classification Search ................... 361/42
See application file for complete search history.

(56) References Cited

U.S. PATENT DOCUMENTS 4,063,299 A   12/1977   Munroe
4,578,732 A   3/1986    Draper et al.
4,831,496 A   5/1989    Brant et al.
4,872,087 A   10/1989   Brant
4,969,063 A   11/1990   Scott et al.
5,202,662 A   4/1993    Bienwald et al.
5,363,269 A   11/1994   McDonald
5,481,235 A * 1/1996    Heise et al. ................ 335/18
5,541,800 A   7/1996    Misencik
5,546,266 A   8/1996    Mackenzie et al.
5,594,398 A   1/1997    Marcou et al.
5,600,524 A   2/1997    Neiger et al.
5,793,587 A   8/1998    Boteler
5,847,913 A   12/1998   Turner
5,963,408 A   10/1999   Neiger et al.

(Continued)

FOREIGN PATENT DOCUMENTS

WO   WO 02/33720 A1   4/2002

*Primary Examiner*—Ronald W Leja
(74) *Attorney, Agent, or Firm*—Alfred N. Goodman; Mark S. Bicks; Kevin M. Barner

(57) ABSTRACT

An apparatus and method for preventing the miswiring of a protection device. The protection device includes line terminals and load terminals. The protection device further includes a latching mechanism, adapted to move between a closed state which establishes electrical contact between said line and load terminals, and an open state which prevents electrical contact between said line and load terminals; and an initial reset prevention mechanism, adapted to prevent said latching mechanism from being set in said closed state until power is applied to said line terminals.

36 Claims, 22 Drawing Sheets

U.S. PATENT DOCUMENTS

| | | |
|---|---|---|
| 6,052,266 A | 4/2000 | Aromin |
| 6,111,733 A | 8/2000 | Neiger et al. |
| 6,199,264 B1 | 3/2001 | Marcou et al. |
| 6,246,558 B1 | 6/2001 | DiSalvo et al. |
| 6,252,407 B1 | 6/2001 | Gershen |
| 6,421,214 B1 | 7/2002 | Packard et al. |
| 6,424,136 B1 | 7/2002 | Gardner |
| 6,437,700 B1 | 8/2002 | Herzfeld et al. |
| 6,437,953 B2 | 8/2002 | DiSalvo et al. |
| 6,442,007 B1 | 8/2002 | Li |
| 6,456,471 B1 | 9/2002 | Haun et al. |
| 6,522,510 B1 | 2/2003 | Finlay et al. |
| 6,587,319 B1 | 7/2003 | Finlay |
| 6,590,753 B1 | 7/2003 | Finlay |
| 6,628,486 B1 | 9/2003 | Macbeth |
| 6,671,145 B2 | 12/2003 | Germain et al. |
| 6,674,289 B2 | 1/2004 | Macbeth |
| 6,697,238 B2 | 2/2004 | Bonilla et al. |
| 6,724,590 B1 | 4/2004 | Radosavljevic et al. |
| 6,807,036 B2 | 10/2004 | Baldwin |
| 6,864,766 B2 | 3/2005 | DiSalvo et al. |
| 6,873,158 B2 | 3/2005 | Macbeth |
| 6,920,025 B2 * | 7/2005 | Nelson ................. 361/42 |
| 6,952,150 B2 | 10/2005 | Radosavljevic et al. |
| 6,980,005 B2 | 12/2005 | Finlay, Sr. et al. |
| 6,982,856 B2 | 1/2006 | Bernstein |
| 7,019,952 B2 | 3/2006 | Huang et al. |
| 7,031,126 B2 | 4/2006 | Bonilla et al. |
| 7,049,910 B2 | 5/2006 | Campolo et al. |
| 7,133,266 B1 | 11/2006 | Finlay |
| 7,154,718 B1 | 12/2006 | Finlay, Sr. et al. |
| 7,164,564 B1 | 1/2007 | Finlay, Sr. et al. |
| 7,173,799 B1 | 2/2007 | Weeks et al. |
| 7,184,250 B2 | 2/2007 | Bonilla et al. |
| 7,212,386 B1 | 5/2007 | Finlay, Sr. et al. |
| 7,256,973 B1 | 8/2007 | Radosavljevic et al. |
| 7,283,340 B1 | 10/2007 | Finlay, Sr. et al. |
| 2004/0196600 A1 * | 10/2004 | DiSalvo et al. ............ 361/42 |
| 2005/0063110 A1 * | 3/2005 | DiSalvo et al. ............ 361/42 |

* cited by examiner

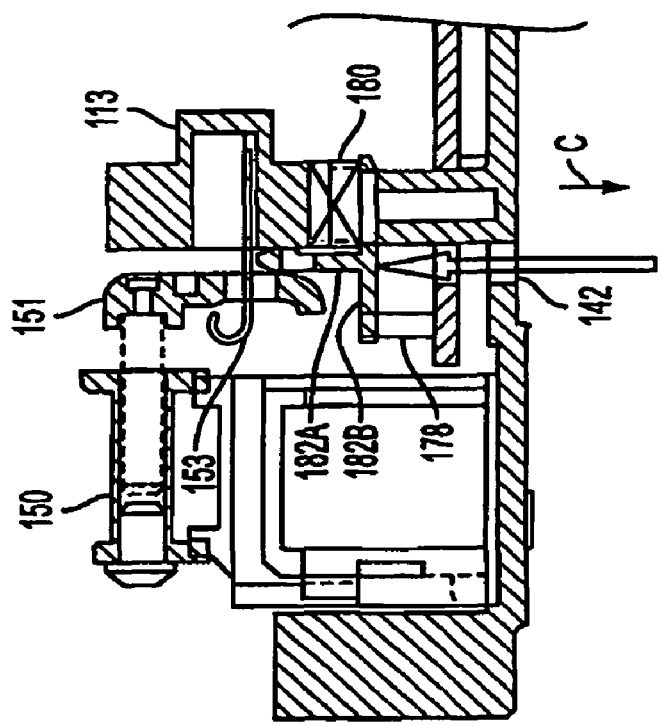
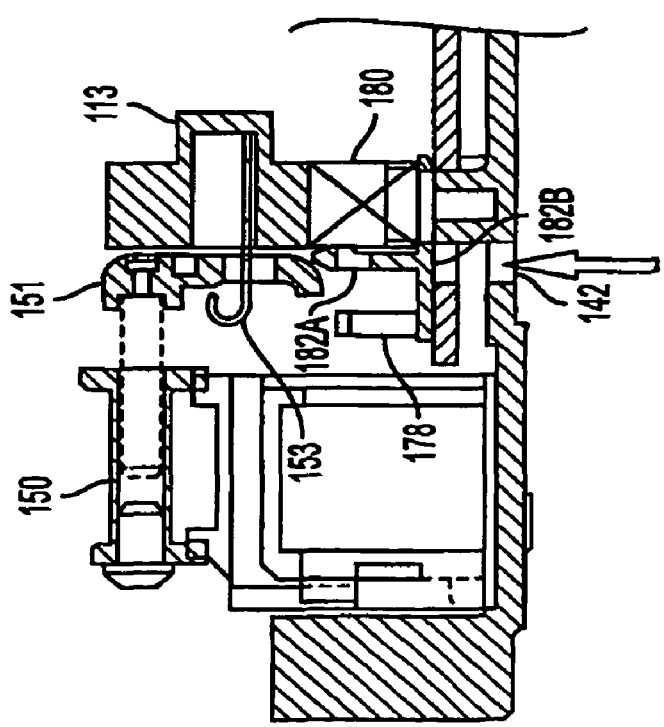
FIG. 17B
FIG. 17A

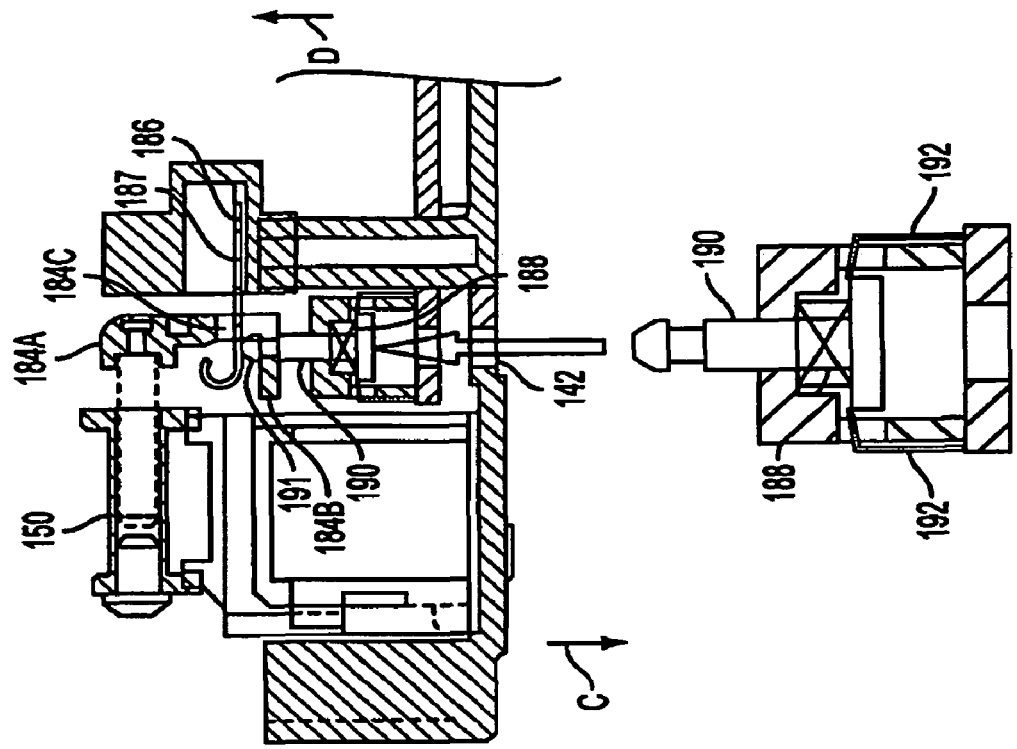
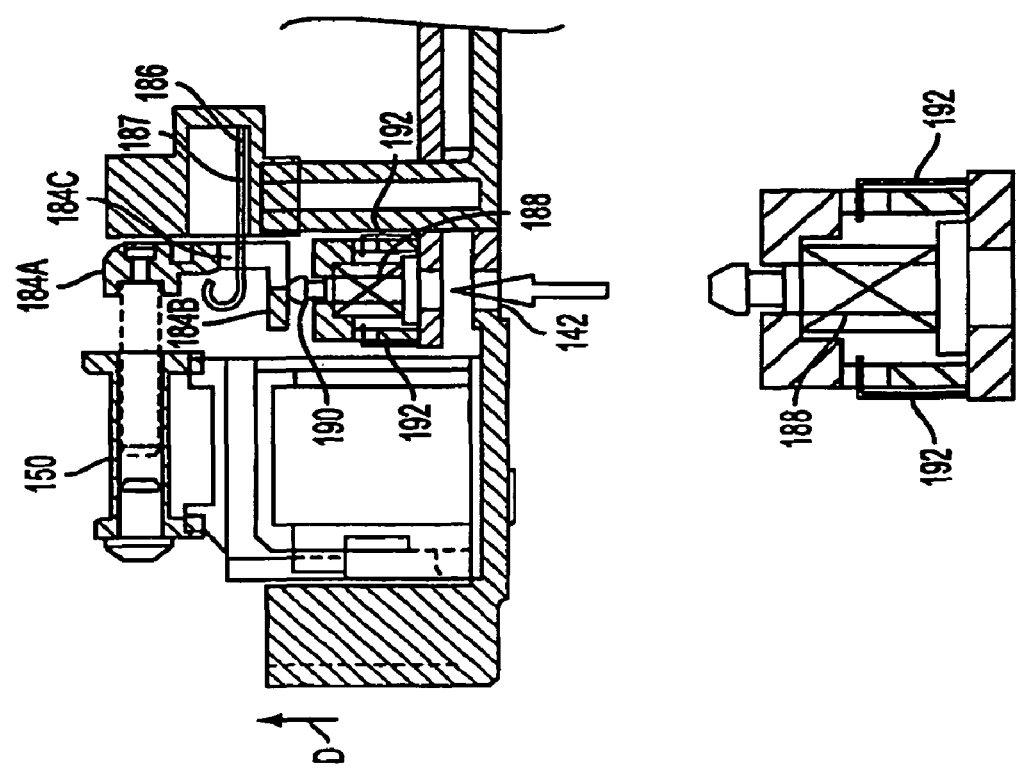

GFCI THAT CANNOT BE RESET UNTIL WIRED CORRECTLY ON LINE SIDE AND POWER IS APPLIED

PRIORITY CLAIM

This application is a continuation of application Ser. No. 11/655,255 filed Jan. 9, 2007, now U.S. Pat. No. 7,538,994 which is a continuation of application Ser. No. 10/434,101 filed May 9, 2003, now U.S. Pat. No. 7,184,250 which claims benefit from U.S. Provisional Patent Application Ser. No. 60/378,647, filed on May 9, 2002 entitled "GFCI With Reversible Line/Load Wiring Capability", the entire contents of which is incorporated herein by reference.

CROSS REFERENCE TO RELATED APPLICATIONS

Related subject matter is disclosed in U.S. patent application Ser. No. 10/032,064, filed on Dec. 31, 2001 entitled "Ground Fault Circuit Interrupter (GFCI) With A Secondary Switch Contact Protection", the entire contents of which is incorporated herein by reference.

FIELD OF THE INVENTION

The present invention generally relates to ground fault circuit interrupter (GFCI) devices. More particularly, the invention relates to a GFCI device that isolates the face terminals from the load side and prevents an initial miswiring of the GFCI from the load side.

BACKGROUND OF THE INVENTION

GFCI devices are designed to trip in response to the detection of a ground fault condition at an AC load. Generally, the ground fault condition results when a person comes into contact with the line side of the AC load and an earth ground at the same time, which is a situation that can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, a solenoid activates a latched circuit breaker within the GFCI device to an open condition, thereby opening both sides of the AC line and removing all power from the load.

Some GFCIs include a lockout feature that prevents the GFCI from operating if the solenoid fails to operate. For example, in U.S. Pat. No. 6,381,112 to DiSalvo, which is incorporated by reference herein, a GFCI is provided with a permanent lockout feature which prevents the GFCI from being reset if the solenoid fails to operate or if an open neutral condition exists. However, having a permanent lockout, which prevents the GFCI from operating, can be undesirable. For example, if a homeowner is entertaining guests in the kitchen, a power interrupt can occur requiring the GFCIs to be reset. If a GFCI connected to an appliance is locked out, the homeowner may have to use an extension cord to connect an appliance to a non-CFCI receptacle. In front of guests, this can prove to be embarrassing and inconvenient to the homeowner.

GFCIs can also include an LED to provide a trip indication as disclosed in U.S. Pat. No. 4,568,997, to Bienwald et al., the contents of which are incorporated herein by reference herein, This type of receptacle includes test and reset pushbuttons and a lamp or light-emitting diode (LED) which indicates that the circuit is operating normally. When a ground fault occurs in the protected circuit, or when the test button is depressed, the GFCI device trips and an internal circuit breaker opens both sides of the AC line. The tripping of the circuit breaker causes the reset button to pop out and the LED to be extinguished, providing a visual indication that a ground fault has occurred. In order to reset the GFCI device, the reset button is depressed in order to close and latch the circuit breaker, and this also causes the LED to illuminate once again. However, the GFCI disclosed in the Bienwald et al. patent does not provide an indication of a defective solenoid.

In addition to ground fault detection/protection, protection for the receptacle terminals of the GFCI is also needed. Specifically, the conventional GFCI device has a set of load terminals that are shared with the receptacle terminals leading to the face of the GFCI. Typically, the AC source is connected to the line terminals while the downstream load devices are connected to the load terminals. However, if the GFCI is miswired, this poses a problem. When the load terminals are connected to an AC source, the receptacle terminals are powered. The installer would be under the impression that the GFCI was operating correctly. However, the installer would be unaware that the GFCI is not providing ground fault protection even when a fault condition is detected. Thus, while tripping the latching mechanism in response to a miswiring condition, only the downstream devices are open. Devices plugged into the GFCI receptacle are still connected to AC power since the face terminals are directly connected to the line/load terminals.

It is therefore desirable to provide a latching mechanism that does not share the contacts between the receptacle terminals and the load terminals.

It is also desirable to provide a protection device that is not permanently disabled when the solenoid fails.

It is also desirable to provide a protection device that provides protection from miswiring, and permanently disables a miswiring prevention device once the protection device is correctly wired.

SUMMARY OF THE INVENTION

The above and other objectives are substantially achieved by a system and method employing a ground fault circuit interrupter (GFCI) in accordance with the principles of the present invention.

According to an embodiment of the present invention, an apparatus and method for preventing the miswiring of a protection device is employed. The protection device includes line terminals and load terminals. The protection device further includes a latching mechanism, adapted to move between a closed state which establishes electrical contact between said line and load terminals, and an open state which prevents electrical contact between said line and load terminals; and an initial reset prevention mechanism, adapted to prevent said latching mechanism from being set in said closed state until power is applied to said line terminals.

According to another embodiment of the present invention, a protective device having source and load terminals between a conductive path and face terminals is provided. The protective device includes a latching mechanism, adapted to be operable between a first state in which said latching mechanism permits electrical contact between said source load terminals and said load terminals and a second state in which said contact is broken; and a sensing circuit, adapted to selectively place the latching mechanism in said second state upon detection of a ground fault condition to electrically isolate said face terminals from said source and load terminals. a device is connected between hot and neutral conductors of an AC line.

BRIEF DESCRIPTION OF DRAWINGS

FIGS. 17A and 17B are cross sectional views illustrating examples of positions of a initial reset prevention arrangement that can be used with a GFCI in accordance with an embodiment of the present invention; and FIGS. 18A and 18B are cross sectional views illustrating examples of positions of a another initial reset prevention arrangement that can be used with a GFCI in accordance with an embodiment of the present invention.

DETAILED DESCRIPTION OF THE PREFERRED EMBODIMENTS

Figure 1:
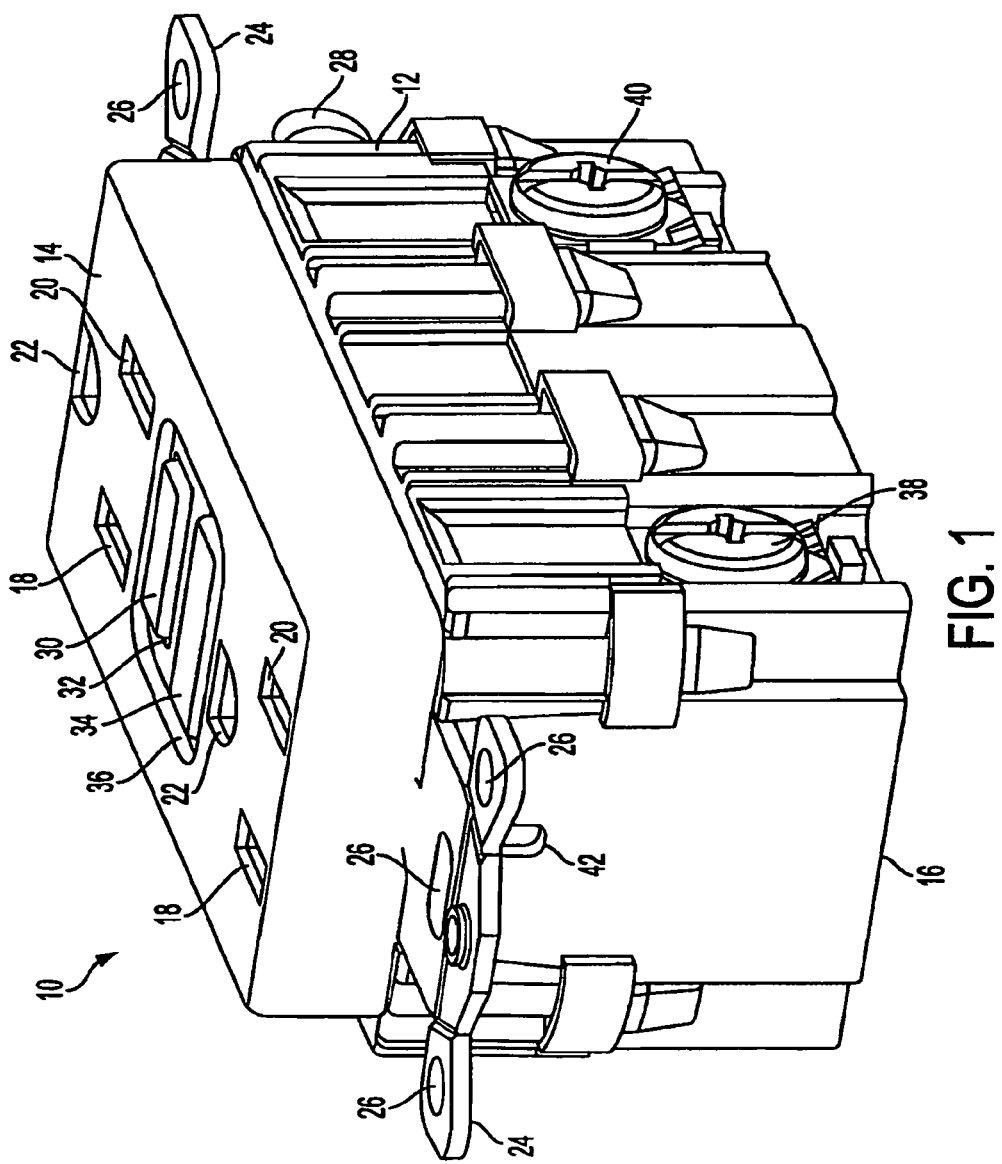
FIG. 1 is a perspective view of an example of a ground fault circuit interrupting (GFCI) device in accordance with an embodiment of the present invention.

FIG. 1 is a perspective view of an example of a ground fault circuit interrupting (GFCI) device 10 in accordance with an embodiment of the present invention. The GFCI device 10 comprises a housing 12 having a cover portion 14 and a rear portion 16. The GFCI also includes an inner housing 13 (See FIG. 5) when the cover portion 14 is removed from the rear portion 16. The cover portion 14 and rear portion are removably secured to each other via fastening means such as clips, screws, brackets, tabs and the like. The cover portion includes plugin slots (also known as face receptacles) 18 and 20 and grounding slots 22. It will be appreciated by those skilled in the art that plugin slots 18 and 20 and grounding slots 22 can accommodate polarized, non-polarized, grounded or non-grounded blades of a male plug. The male plug can be a two wire or three wire plug without departing from the scope of the present invention. The GFCI receptacle 10 further includes mounting strap 24 having mounting holes 26 for mounting the GFCI receptacle 10 to a junction box (not shown). At the rear wall of the housing 12 is a grounding screw 28 for connecting a ground conductor (not shown).

A test button 30 extends through opening 32 in the cover portion 14 of the housing 12. The test button is used to activate a test operation, that tests the operation of the circuit interrupting portion disposed in the GFCI receptacle 10. The circuit interrupting portion, to be described in more detail below, is used to break electrical continuity in one or conductive paths between the line and load side of the GFCI receptacle 10. A reset button 34 extends through opening 36 in the cover portion 14 of the housing 12. The reset button 34 is used to activate a reset operation, which reestablishes electrical continuity in the open conductive paths.

Figure 2:
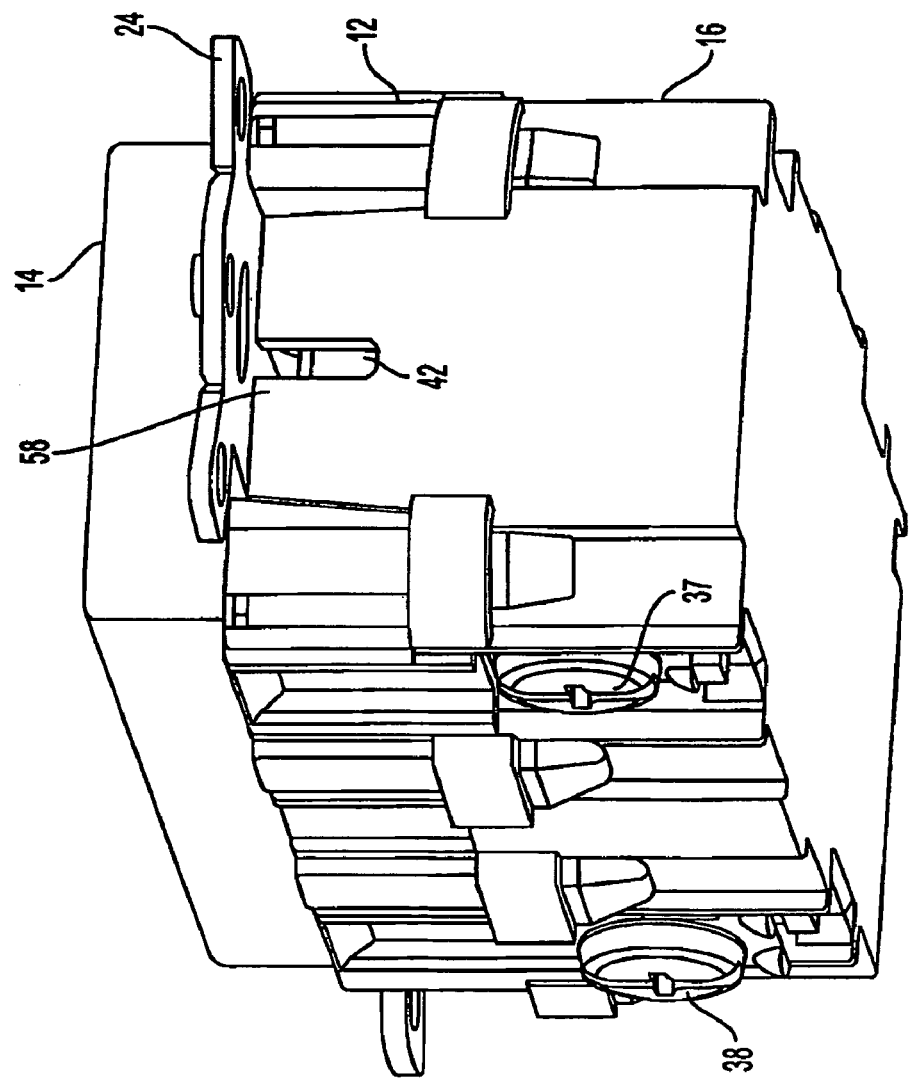
FIG. 2 is another perspective view of the ground fault interrupting device shown in FIG. 1 in accordance with an embodiment of the present invention.

Rear portion 16 has four screws, only two of which are shown in FIG. 1. Load terminal screw 38 is connected to a neutral conductor and an opposing load terminal screw 37 (See FIG. 2) is connected to the hot conductor. Line terminal screw 40 is connected to the neutral conductor and an opposing line terminal screw 39 (See FIG. 2) is connected to the hot conductor. It will be appreciated by those skilled in the art that the GFCI receptacle 10 can also include apertures proximate the line and load terminal screws 37, 38, 39 and 40 to receive the bare end of conductors rather than connecting the bare end of the wires to the line and load terminal screws.

In an embodiment of the present invention rear portion 16 also contains an aperture 42 (See FIG. 2) for accessing the internal portion of the GFCI receptacle 10 for testing during the manufacturing process. Specifically, the aperture 42 provides access to a locking plate 58. The aperture 42 is sealed prior to shipping of the GFCI receptacle 10 to distributors.

Figure 3:
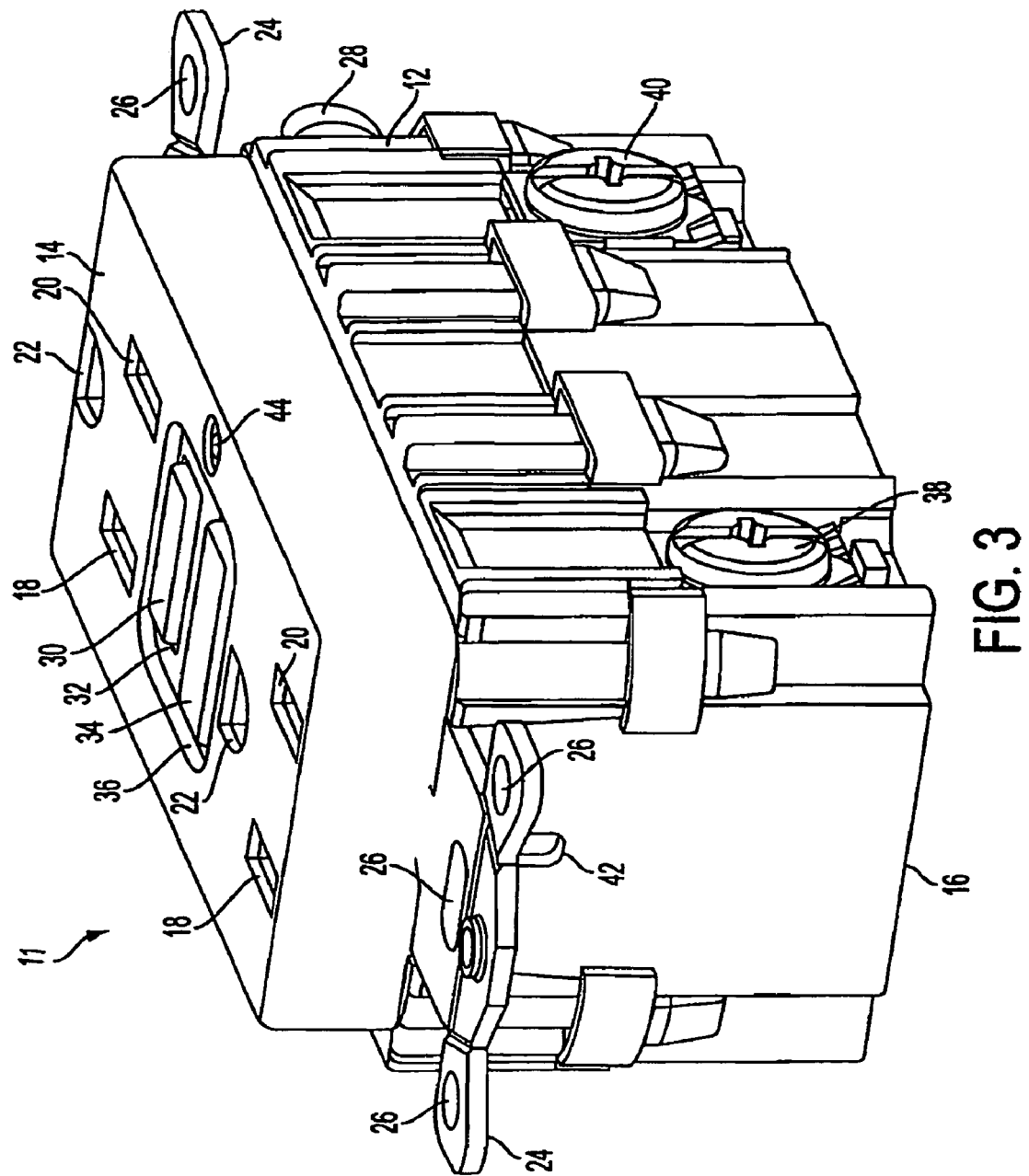
FIG. 3 is a perspective view of an example of the ground fault circuit interrupting device shown in FIG. 1 having an indicator in accordance with an embodiment of the present invention.

FIG. 3 is a perspective view of an example of a ground fault circuit interrupting (GFCI) device 11 having an indicator in accordance with an embodiment of the present invention. Specifically, GFCI device 11 is similar in operation to the GFCI 10 except GFCI device 11 has an alarm indicator 44 for providing an indication to a user that GFCI device 11 is not providing ground fault protection, or in other words, GFCI device 11 is operating as a normal receptacle.

Alarm indicator 44 comprises a dual color lamp which provides a first color when a first filament is activated and a second color when a second filament is activated. In an embodiment of the present invention, the alarm indicator 44 illuminates to provide a green color when the GFCI receptacle 11 is operating normally and providing GFCI protection. In another embodiment of the present invention, the alarm indicator 44 illuminates to provide a flashing red color when the GFCI receptacle 11 is operating as a normal receptacle and not providing ground fault protection. It should be appreciated by those skilled in the art that although the alarm indicator is described as being a dual filament lamp, two separate single filament lamps, a single lamp having a single filament, or a buzzer, or any other suitable indicator such as a colored lamp can be used to provide an alarm indication without departing from the scope of the present invention.

Figure 4:
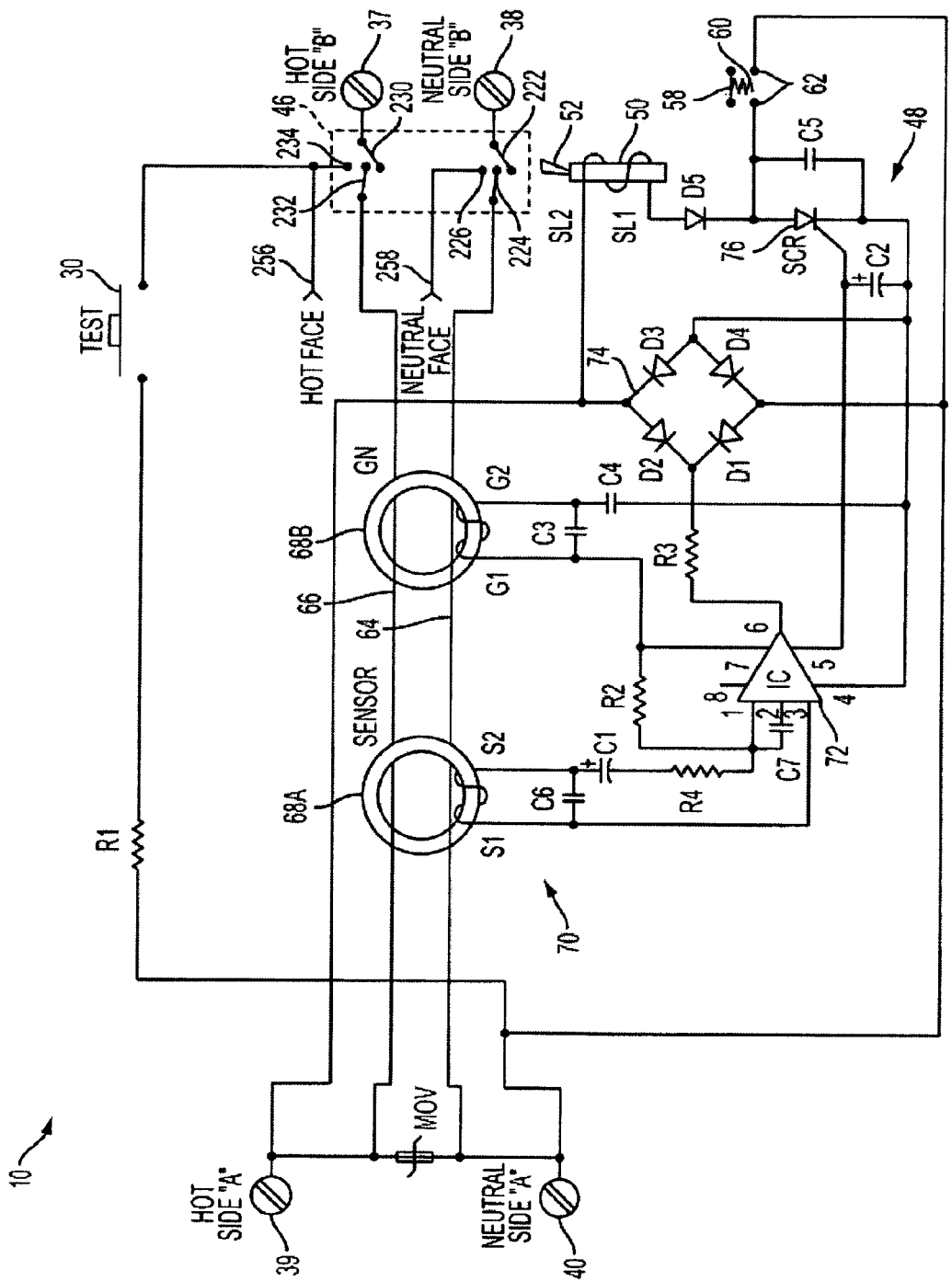
FIG. 4 is a schematic diagram illustrating an example of the circuitry of the ground fault circuit interrupting device of FIG. 1 in accordance with an embodiment of the present invention.

FIG. 4 is a schematic diagram illustrating an example of the circuitry of the ground fault circuit interrupting device of FIG. 1 in accordance with an embodiment of the present invention. In accordance with this embodiment, the GFCI device 10 is provided with a latching mechanism 46, sensing circuit 48, solenoid 50, solenoid plunger 52, latching plate 54 (See FIG. 8), reset pin 56 (See FIG. 8), locking plate 58, locking spring 60, secondary contacts 62, neutral conductor 64, hot conductor 66, a transformer arrangement 68 comprising sensing transformer 68A and ground transformer 68B, and a control circuit 70.

GFCI device 10 is structured and arranged to prevent an initial miswiring of the GFCI. That is, as described in more detail below, prior to shipping the device for use, the locking plate 58 is pressed downward to engage a projection on the back of plunger 52 and makes contact with secondary contacts 62 to thus close the secondary contacts 62. The reset button 34, when depressed, cannot engage with the latching plate 54 via the reset pin 56 and through aperture 55 (See FIGS. 8-10) in the latching plate 54. When the GFCI receptacle 10 is connected to the line side, the secondary contacts power the solenoid 50, causing solenoid plunger 52 to release locking plate 58 and position latching plate 54 so that the reset pin 56 can engage with the edge of the latching plate 54 forming the opening 55 when the reset button 34 is depressed.

Figure 5:
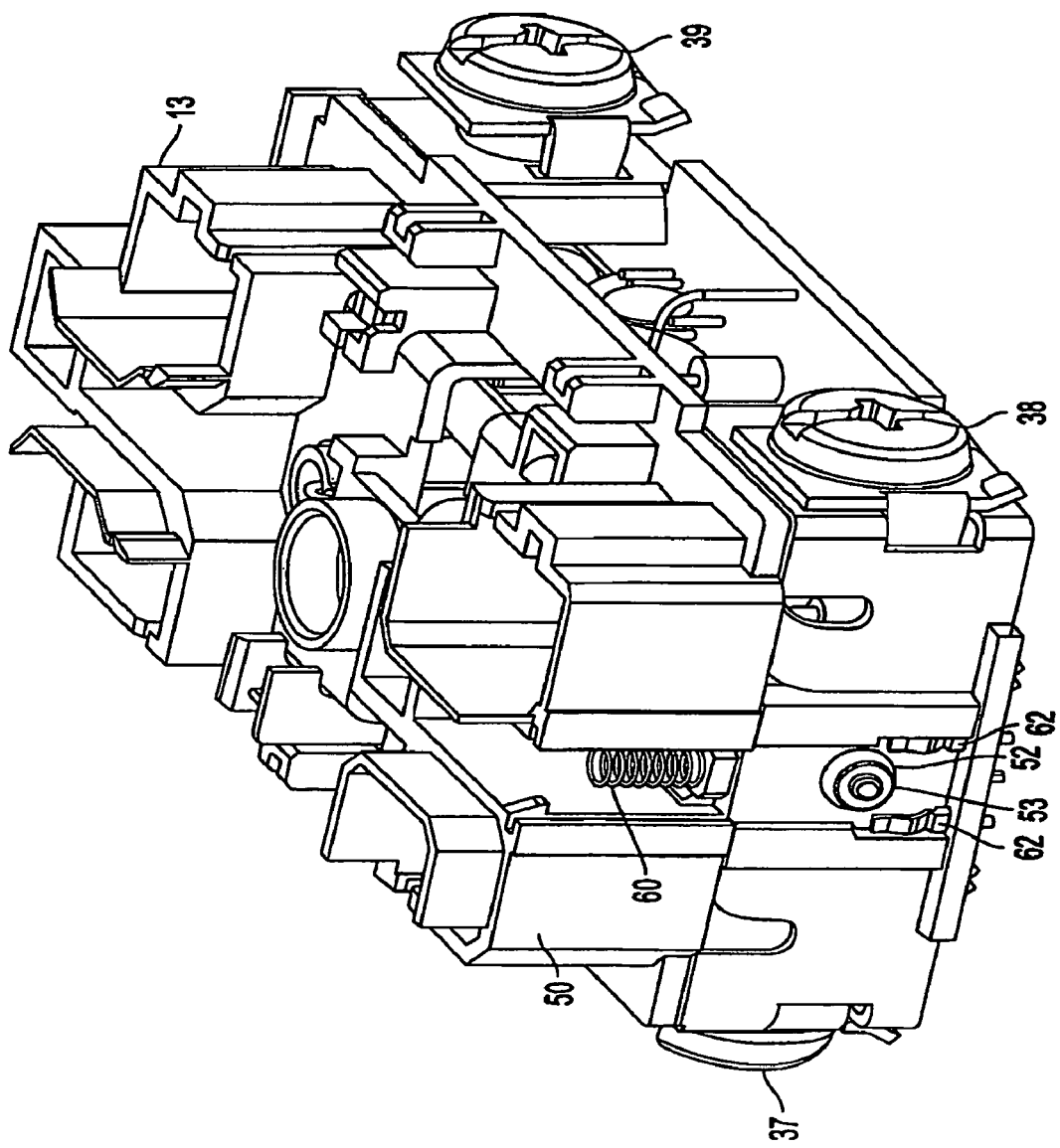
FIGS. 5-7 are perspective views illustrating examples of positions of a locking plate of the ground fault circuit interrupting device shown in FIG. 1 in accordance with an embodiment of the present invention.
Figure 6:
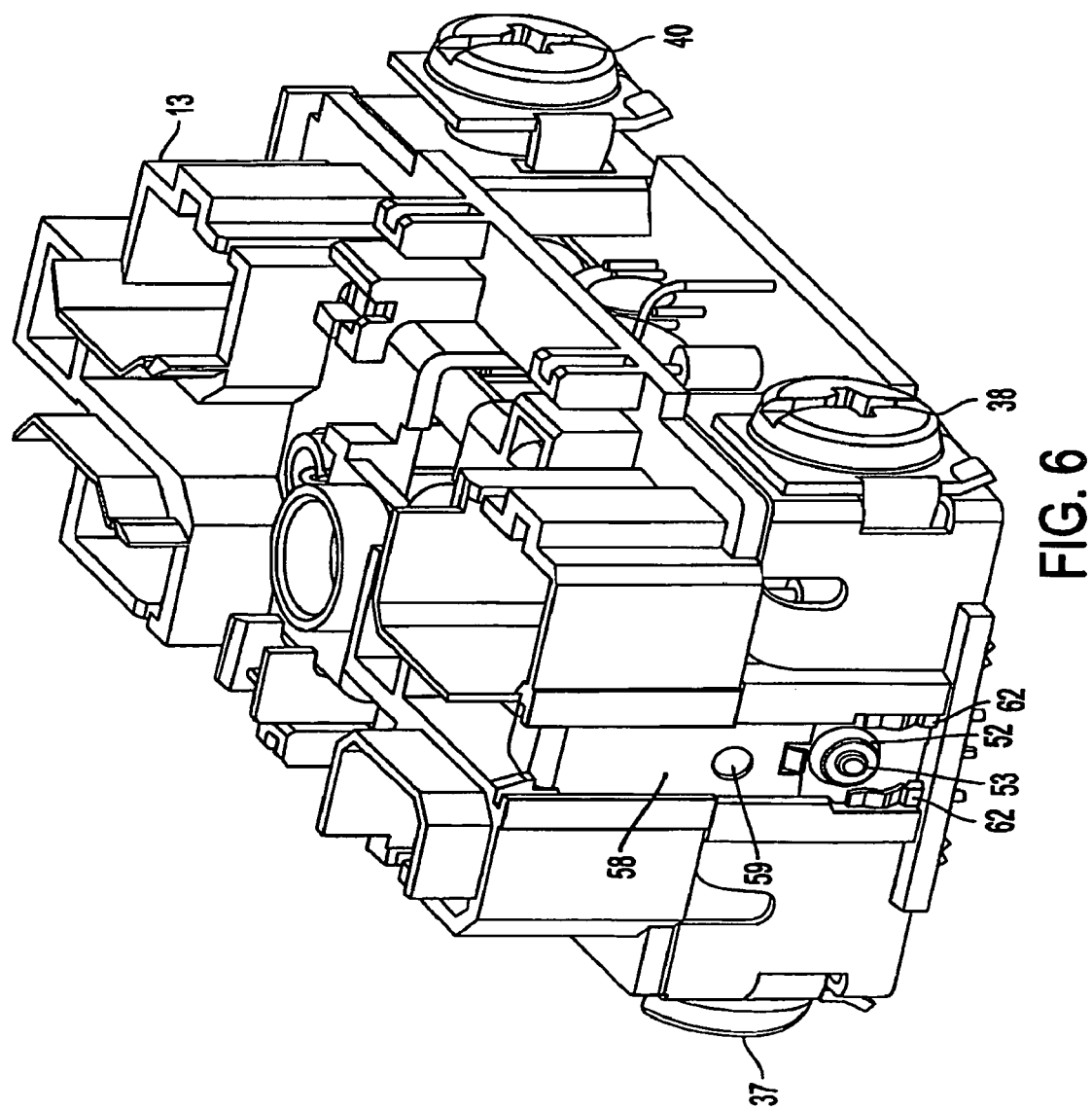
Figure 7:
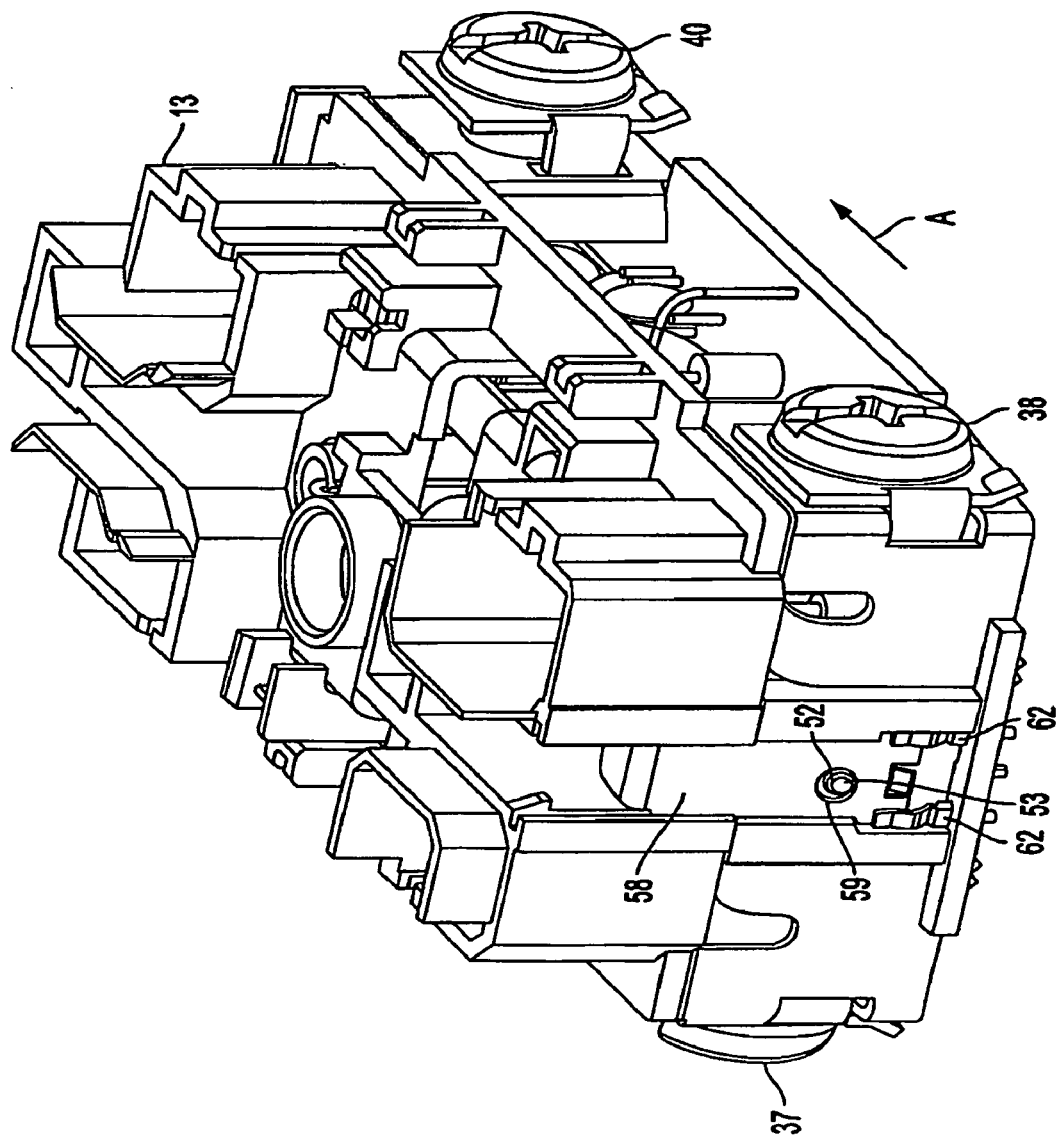

FIGS. 5-7 are perspective views illustrating examples of positions of the locking plate 54 in accordance with an embodiment of the present invention. In FIG. 5 the cover portion 14 of the housing 12 is removed to expose the internal housing 13 of the GFCI 10. The locking spring 60, secondary contacts 62, solenoid plunger 52 and solenoid 50 are shown. The locking spring 60 is in an extended or release position and is not exerting pressure.

In FIG. 6, the locking plate 58 is shown in a released or extended position. The locking spring 60 (See FIG. 5) holds the locking plate 58 up, thus preventing aperture 59 of the locking plate 58 from engaging with the projection 53 of the plunger 52 or from making contact with the secondary contacts 62 and closing the secondary contacts 62.

In FIG. 7, the locking plate 58 is shown as being in the down position and engaged with the projection 53 on the plunger 52 and, thus closing the secondary contacts 62. That is, an aperture 59 in the locking plate 58 interlocks with the projection 53 on the plunger 52 and holds the locking plate 58 in a position in which the locking plate 58 makes contact with and closes the secondary contacts 62. When the reset button 34 is depressed and the locking plate 58 is in a locked state, the reset pin 56 cannot engage with the latching plate 54 because the plunger 52 positions the latching plate 54 such that the reset pin 56 passes through opening 55 freely. The locking plate 58 will remain in this position until the GFCI receptacle 10 is powered from the line side. As can be appreciated from the schematic in FIG. 4, the load terminals 37 and 38 are electrically isolated from the remainder of the circuit when the latching mechanism 46 is in the open state as shown in FIG. 4. However, as is also shown, the secondary contacts 62, when closed by the locking plate 58, provide a path which enables the solenoid to be powered from the power source connected to the line terminals 39 and 40 and move the plunger 52 in the direction of "A", thereby removing the projection 53 of the plunger 52 from the aperture 59 and releasing the locking plate 58. Accordingly, the spring 60 raises the locking plate 58 upward and out of contact with secondary contacts 62, thus opening the secondary contacts 62.

Figure 8:
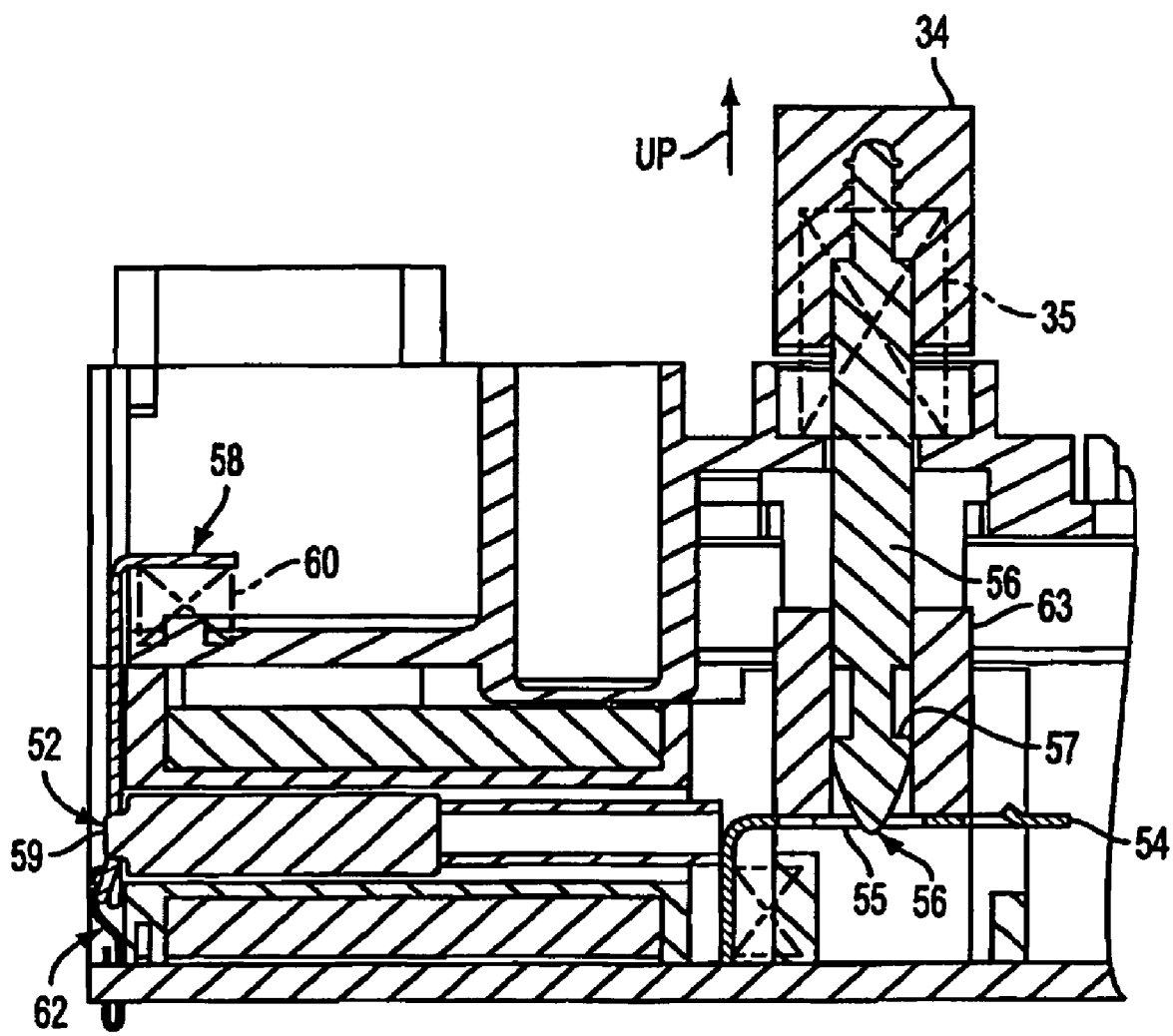
FIGS. 8-10 are cross sectional views illustrating examples of positions of the locking plate, a latching plate and a reset pin of the ground fault circuit interrupting device of FIG. 1 in accordance with an embodiment of the present invention.
Figure 9:
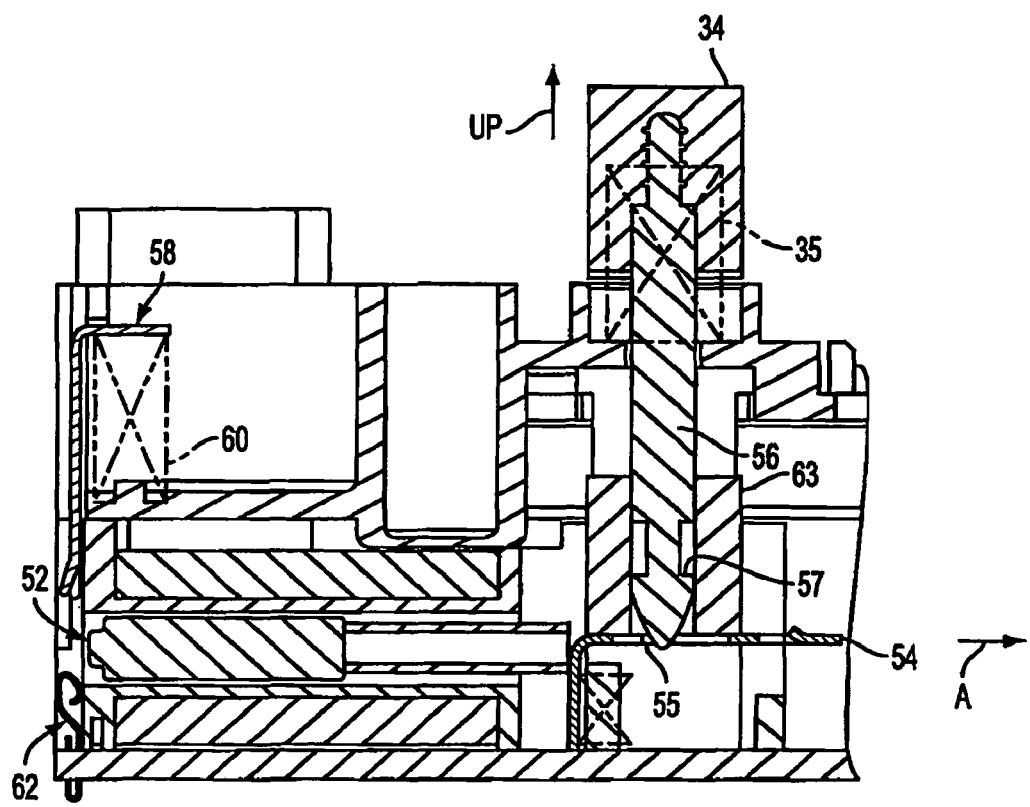
Figure 10:
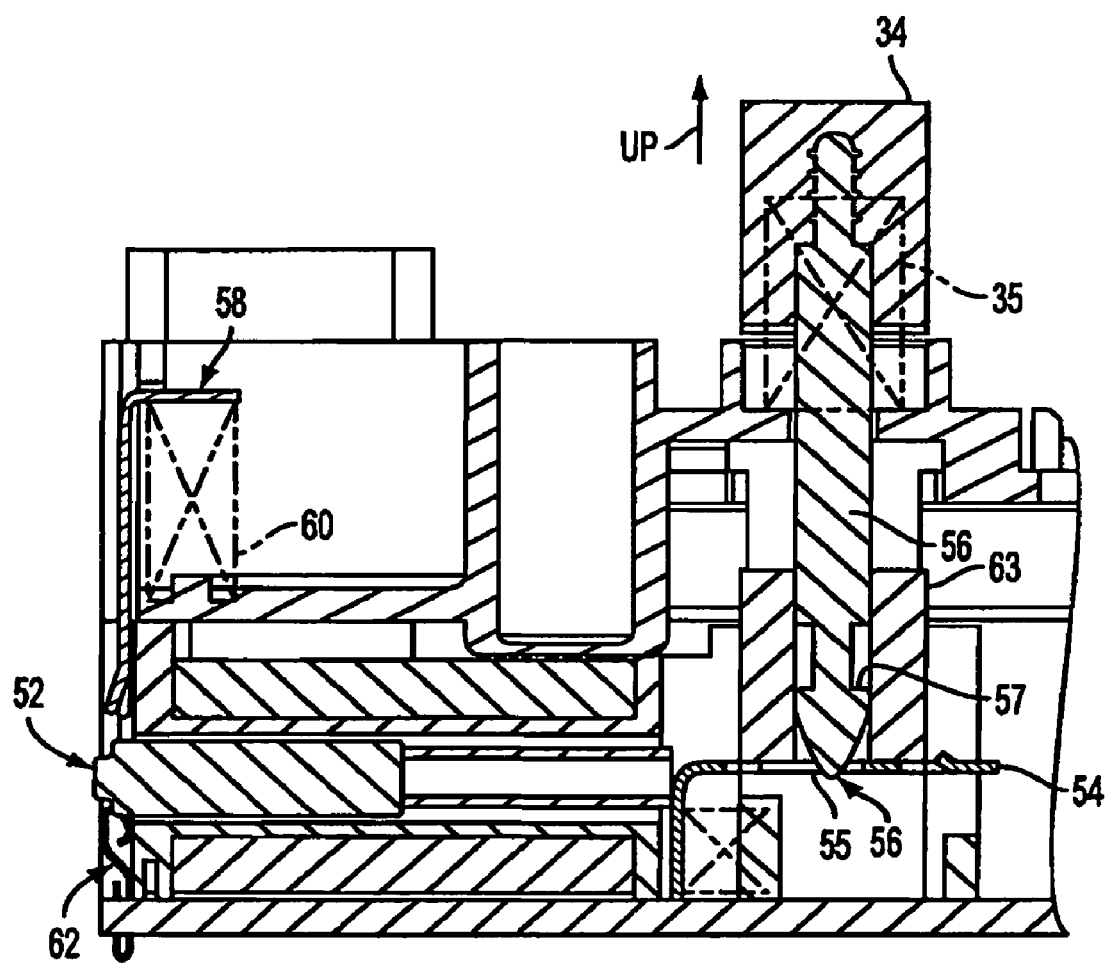

FIGS. 8-10 are cross sectional views illustrating examples of positions of the locking plate 58, a latching plate 54 and a reset pin 56 in accordance with an embodiment of the present invention. In FIG. 8, the locking plate 58 is shown as being engaged with the projection 53 of the plunger 52 via the aperture 59. The locking plate 58 makes contact with secondary contacts 62, thus closing them. Locking spring 60 is compressed and exerts pressure against the locking plate 58, but cannot move locking plate 58 upwards because locking plate 58 is held in place by projection 53. In addition, latching plate 54 is positioned to prevent the reset pin 56 from engaging with the latching plate 54. That is, the latching plate 54 is positioned to allow the reset pin 56 to freely pass through the latching plate 54 when the reset button is depressed without engaging with the latch plate 54.

In FIG. 9, the GFCI receptacle 10 is powered from the line side. The secondary contacts 62 which are closed, power the solenoid 50, which drives the plunger 52 forward in the direction of "A". This releases the projection of the plunger 52 from the aperture 59, and also pushes the plunger 52 against the latching plate 54 to position the opening 53 slightly out of alignment with the reset pin 56. The locking spring 60 urges the locking plate 58 upward, thus forcing the locking plate into an extended or non-contacting position. The secondary contacts 62 open and remove power from the solenoid 50.

As shown in FIG. 10, the GFCI receptacle 10 is in a state of normal operation. That is, the locking plate 58 and locking spring 60 are in an extended position, the secondary contacts are open, and the reset pin 56 is able to engage with the edges of the latch plate 54 forming the aperture 53, thus allowing the upper shoulder 57 of the reset pin 56 to contact and thus engage with the underside of latching plate 54 when the reset button is depressed. Although not shown specifically, the spring 60 can thus urge the reset button upward along arrow "UP", thus drawing the latch plate 54 and latch block 63 upward. The latch block 63 thus closes the contacts of latching mechanism 46 to thus provide electrical connection between the line terminals 39 and 40, and their respective load terminals 37 and 38 and face terminals "hot face" and "neutral face".

Referring now to FIG. 1 and the operation of the GFCI receptacle 10 in a ground fault state. The GFCI receptacle 10 is disabled upon detection of a current imbalance. Specifically, the sensing circuit 48 selectively places the solenoid 50 in a ground fault state in response to an imbalance of current flow in the AC receptacle. While the solenoid 50 is shown here as being a solenoid, other devices such as piezoelectric components and micro electromechanical systems (MEMS) may be used. It can also be seen that the latching mechanism 46 is connected to the sensing circuit 48 and is placed in series with a plurality of conductive paths between opposing terminals of the receptacle. Specifically, the latching mechanism 46 breaks a plurality of conductive paths leading from side line terminals 39 and 40 to side load terminals 37 and 38 of the GFCI device 10 when the solenoid 16 is placed in the ground fault state.

The latching mechanism 46 is structured such that plugins 18 and 20, the face receptacles, are isolated from the line terminals 39 and 40 and the load terminals 37 and 38. Thus if the GFCI 10 is miswired and/or in a tripped position, plugins 18 and 20 will not be powered. A detailed description of the operation of latching mechanism 46 can be found in U.S. Provisional Patent Application Ser. No. 60/378,647, referenced above. Latching mechanism 46 provides improved safety while maintaining a relatively low level of complexity with regard to conventional approaches. The latching mechanism 46 has an internal structure that breaks the conductive paths between the side A terminals and the side B terminals and also disconnects a face receptacle hot terminal 256 and a face receptacle neutral terminal 258 from the conductive paths. Specifically, the face receptacle hot terminal 256 is connected to a fifth switch contact 234 and the face receptacle neutral terminal 258 is connected to a first switch contact 226. Both switch contacts 226 and 234 are selectively placed in the conductive paths. Thus, by selectively placing the switch contacts 226 and 234 in the conductive paths, the face hot terminal 256 and face neutral terminal 258 can be isolated from the conductive paths as well as the side A and B terminals 39 and 40 and 37 and 38 when a current imbalance is detected. The latching mechanism 46 thus provides improved safety while maintaining a relatively low level of complexity with regard to conventional approaches. The state of switch contacts 222, 224, 225, 230, 232 and 233 as shown in FIG. 4 indicates that the solenoid 50 has entered the ground fault state, due to depression of the test button or due to an actual ground fault. However, when the solenoid 50 is not in the ground fault state and the latching mechanism has been properly reset so that second switch contact 222 and third and fourth dual-switch contacts 224, 225 are closed to first switch contact 226, and sixth switch contact 230 and seventh and eighth dual-switch contacts 232, 233 are closed to fifth switch contact 234; the first conductive path includes the first side A terminal 40, first side A conductor 64, first switch contact 226, second switch contact 222, third and fourth dual-switch contacts 224, 225, face terminal receptacle neutral 258, and first side B terminal 38. Similarly, the second conductive path includes second side A terminal 39, a second side A conductor 66, fifth switch contact 234, sixth switch contact 230, seventh and eighth dual-switch contacts 232, 233, face terminal receptacle hot 256, and second side B terminal 37. While the first and second conductive paths are shown as corresponding to the neutral and hot connections respectively, it will be appreciated that these assignments can readily be reversed without departing from the scope of the present invention.

It can further be seen that the latching mechanism 46 is structured such that, in response to a reset button 34 (see FIG. 19) being pressed on the AC receptacle, second switch contact 222 comes into contact with fourth switch contact 225. The upward movement of second switch contact 222 provides for the second switch contact 222 and third and fourth dual-switch contacts 224, 225 making contact with first switch contact 226. Similarly, the sixth switch contact's 230 upward movement provides for sixth switch contact 230 coming into contact with eighth switch contact 233. The upward movement is continued until the sixth switch contact 230 and seventh and eighth dual-switch contacts 232, 233 make contact with fifth switch contact 234. Thus, face receptacle hot and face receptacle neutral terminals 256 and 258 are connected with the conductive paths and can provide power to a load that is plugged into the receptacles.

Figure 19:
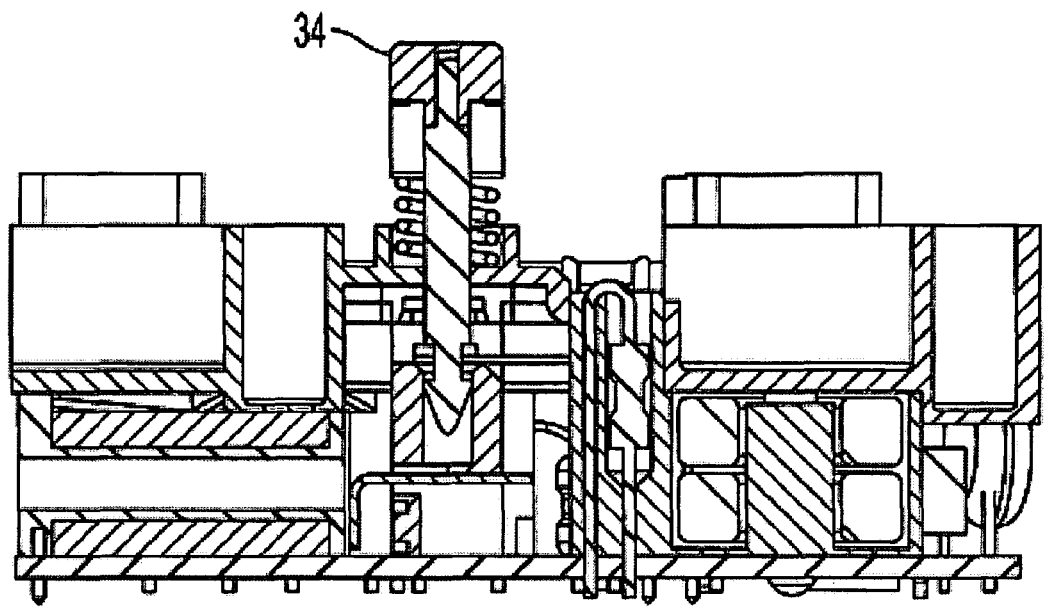
FIGS. 19-26 are diagrams showing various positions of switch contacts for the circuit of FIG. 4.
Figure 20:
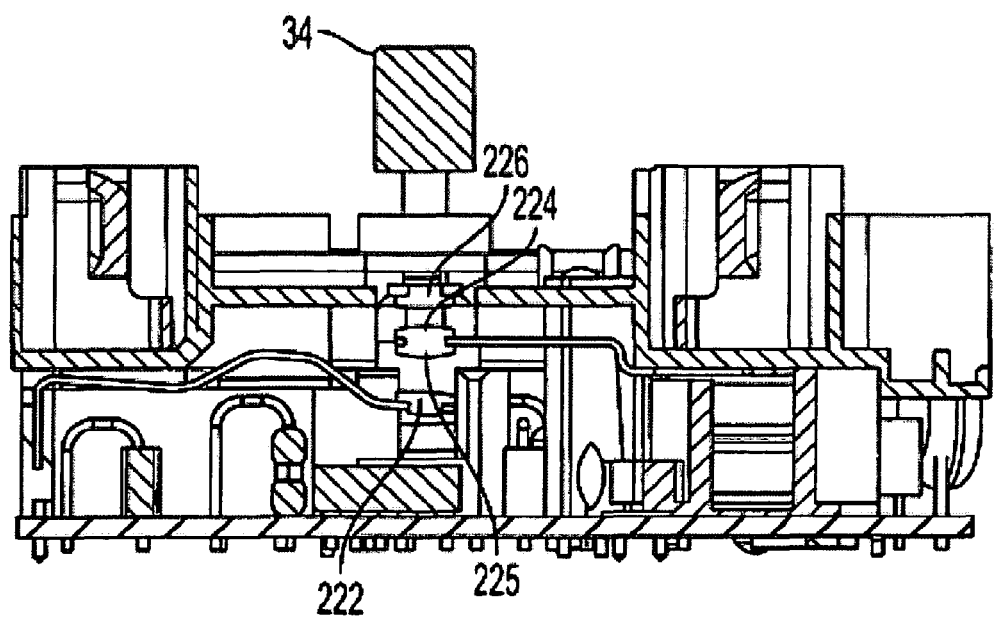
Figure 21:
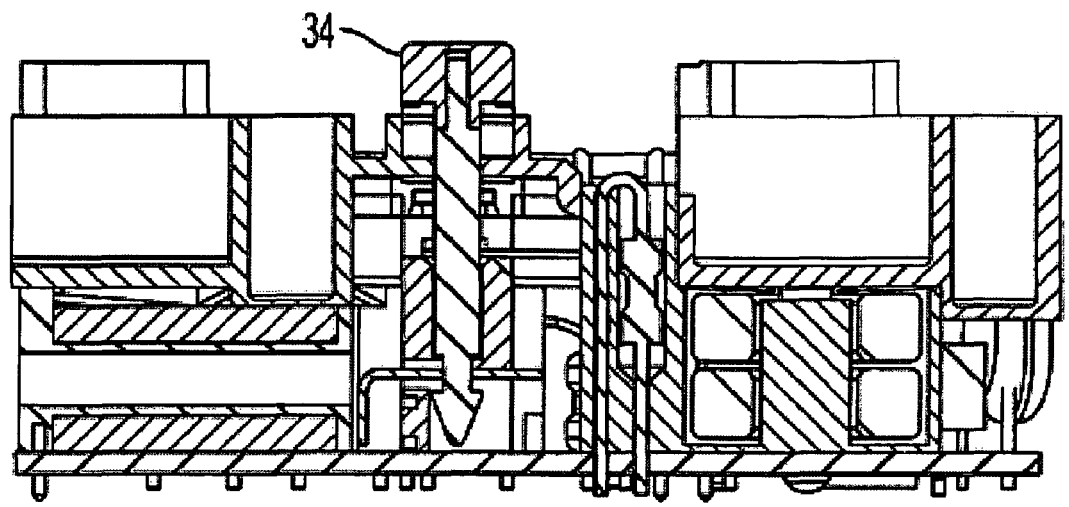
Figure 22:
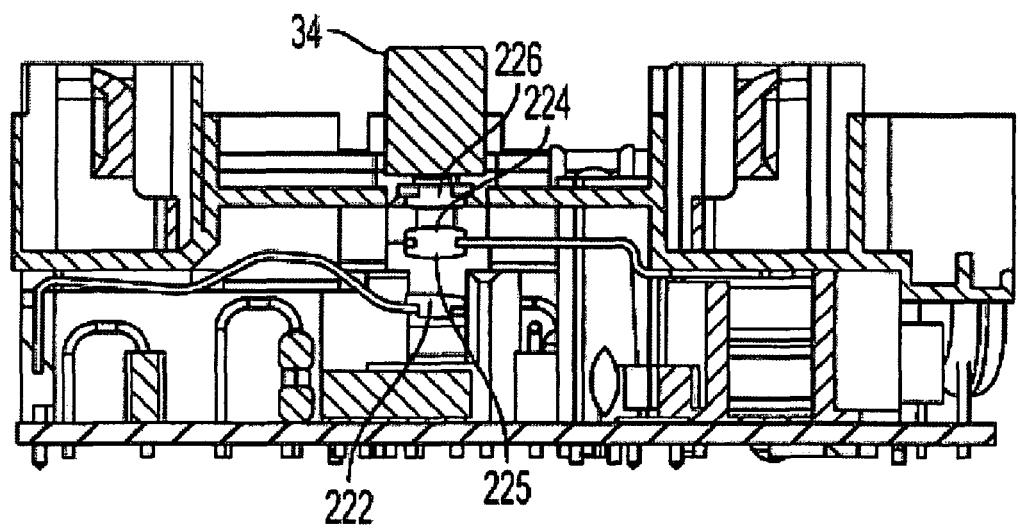
Figure 23:
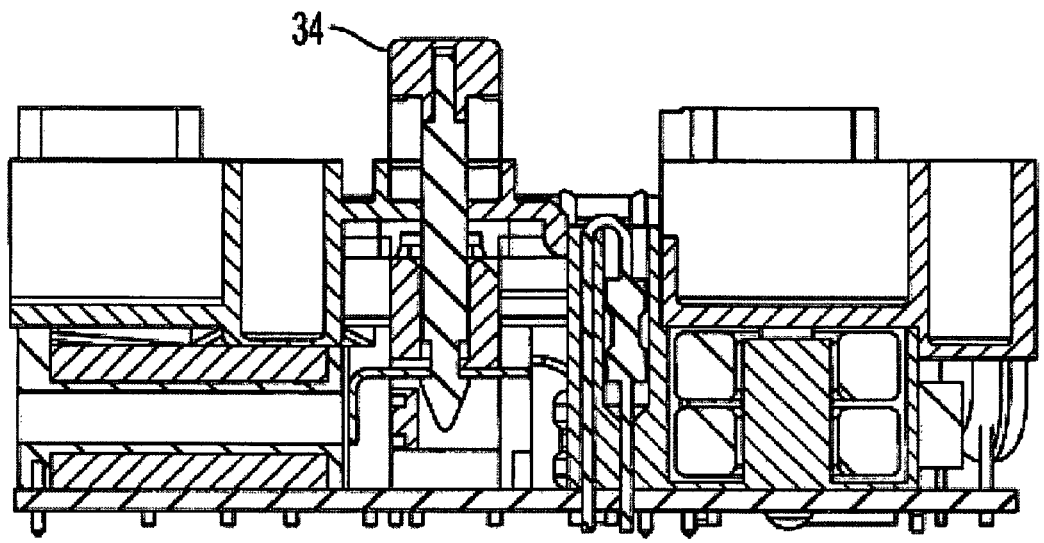
Figure 24:
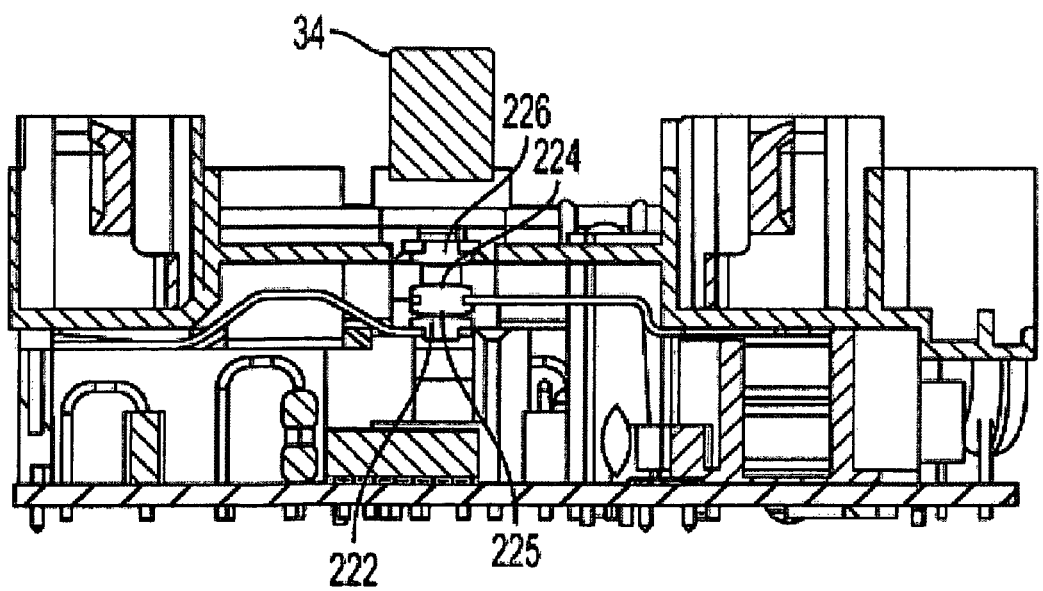
Figure 25:
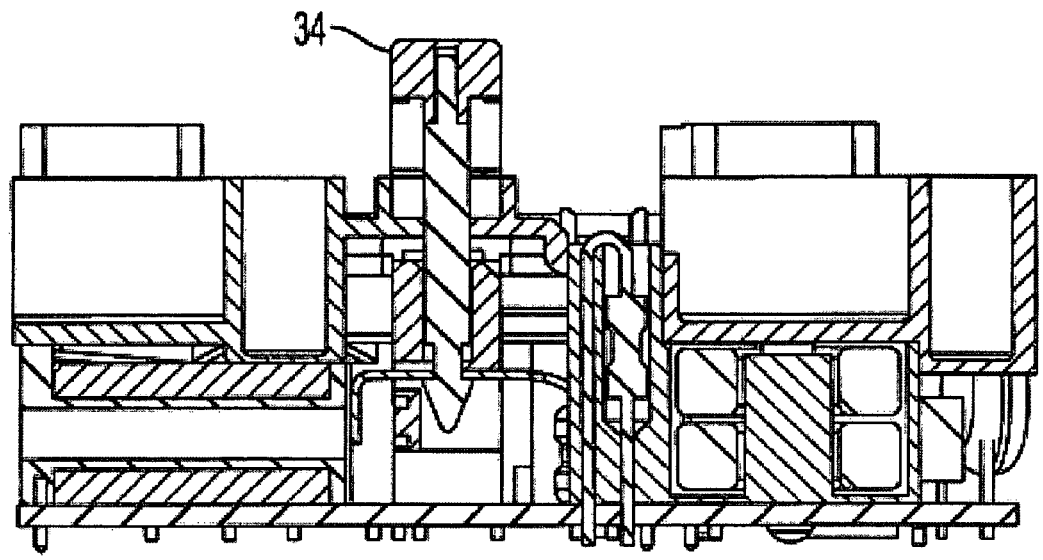
Figure 26:
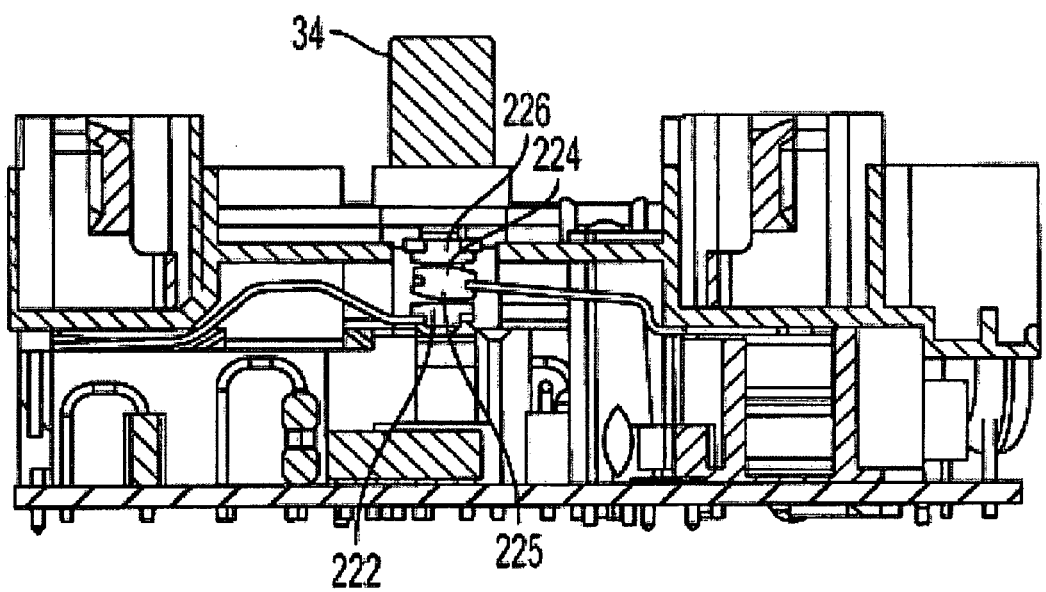

Turning now to FIGS. 19-26 which are diagrams showing various positions of switch contacts for the circuit of FIG. 4 in accordance with an alternative embodiment of the present invention. In FIG. 19, the reset button 34, which in an embodiment of the invention is spring loaded, is in an open position. FIG. 20 which shows the GFCI from a different angle depicts first switch contact 226, second switch contact 222, and third and fourth dual-switch contacts 224, 225 being open with respect to each other. FIG. 21 shows the reset button 34 in a closed position while FIG. 22 shows first switch contact 226, second switch contact 222, and third and fourth dual-switch contacts 224, 225 still being open with respect to each other. As shown in FIG. 23, as the reset button 34 moves back towards an open position, second switch contact 222 moves upward and comes into contact with fourth switch contact 225 (see FIG. 24). When the reset button 34 goes back into the open position (see FIG. 25), second switch contact 222 and third and fourth dual-switch contacts 224, 225 close with first switch contact 226. Although not shown in the drawings, the same sequence of events occur for fifth switch contact 234, sixth switch contact 230, and seventh and eighth dual-switch contacts 232, 233.

It should be noted that the sensing circuit 48 effectively defines an imbalance of current flow as any difference in the amount of current flowing in the candidate paths that rises above a predetermined threshold.

To better demonstrate the operation of latching mechanism 46, the sensing circuit 48 will now be described in greater detail. Generally, it can be seen that the sensing circuit 48 has a transformer arrangement 68, a control circuit 70 and a test switch 30. The transformer arrangement 68 generates control signals in response to the imbalance of current flow, while the control circuit 70 is connected to the transformer arrangement 68 and selectively generates a switching signal based on the control signals. The test switch 30 is connected between the line terminal 40 and the load terminal 37 such that the test switch 30 enables manual generation of the imbalance of current flow.

Specifically, when the test switch 30 is closed (for example, manually, by an installer of the device), a circuit path is created from the load terminal 38 to the line terminal 40, which creates an imbalance that is detected by a first (or sense) transformer 68A. In an embodiment of the invention, the first transformer 68A detects imbalances in the net flux on the load side e.g. terminals 37 and 38 of the GFCI receptacle 10, and operates in conjunction with the control circuit 70 to energize the solenoid 50.

Detection of the imbalance condition by the first transformer 68A and the control circuit 70 causes activation of the solenoid 50 such that the latching mechanism 46 is open as shown in FIG. 1. It can be further seen that a second (grounded neutral) transformer 68B is also provided to allow the transformer arrangement 68 to measure the change in net flux between the first conductive path 64 and the second conductive path 66.

It can be seen that the control circuit 70 preferably includes an amplifier and trip circuit 72, a full-wave bridge rectifier 74 and a silicon controlled rectifier (SCR) 76. The amplifier and trip circuit 72 generate the switching signal, where the bridge rectifier 74 is connected to the line side terminals 39 and 40. It can be seen that the bridge rectifier 74 provides power to the amplifier and trip circuit 72 and that the SCR 76 selectively energizes the solenoid 50 based on the switching signal. The control circuit 70 preferably includes the components listed in the following table:

| | |
|---|---|
| CAPACITOR C1 | 10 MIC OF AND, 16 VDC ALUM, ELECTROLYTIC |
| CAPACITOR C2 | 3.3 MIC, 16 VDC ALUM, ELECTROLYTIC |
| CAPACITOR C3 | .01 MIC, 50 VDC CERAMIC |
| CAPACITOR C4 | .033 MIC, 25 VDC CERAMIC |
| CAPACITOR C5 | .01 MIC, 500 VDC CERAMIC |
| CAPACITOR C6 | .01 MIC, 50 VDC CERAMIC |
| CAPACITOR C7 | 470 PIC, 50 VDC CERAMIC |
| DIODE D1 | IN4004 |
| DIODE D2 | IN4004 |
| DIODE D3 | IN4004 |
| DIODE D4 | IN4004 |
| DIODE D5 | IN4004 |
| RESISTOR R1 | 15K OHM, ¼ W CARBON FILM |
| RESISTOR R2 | 1.5 MED OHM, ¼ W METAL FILM |
| RESISTOR R3 | 24K OHM, ½ W CARBON FILM |
| RESISTOR R4 | 200 OHM, ¼ W CARBON FILM |
| IC | RV4145 |

The state of the latching mechanism 46 as shown in FIG. 4 indicates that the solenoid 50 has entered the ground fault state, due to depression of the test button 30 or due to an actual ground fault. However, when the solenoid 50 is not in the ground fault state and the latching mechanism 46 has been properly reset so that latching mechanism 46 is closed a first and second path is created connecting the line terminals 39 and 40 to the load terminals 37 and 38 providing power to a load when the GFCI 10 is powered from the line side.

It is also important to note that when in the ground fault state, as shown in FIG. 1, an alternative current path is provided between the load terminal 37 and the line terminal 40. Thus, if the AC source is connected to the line side of GFCI receptacle 10 and the test switch 30 is closed, current flows from line side terminal 40, through resistor R1, to the load terminal 37. Thus, this current path will create an imbalance in the transformer arrangement 68 resulting in the latching mechanism 46 being open.

Figure 11:
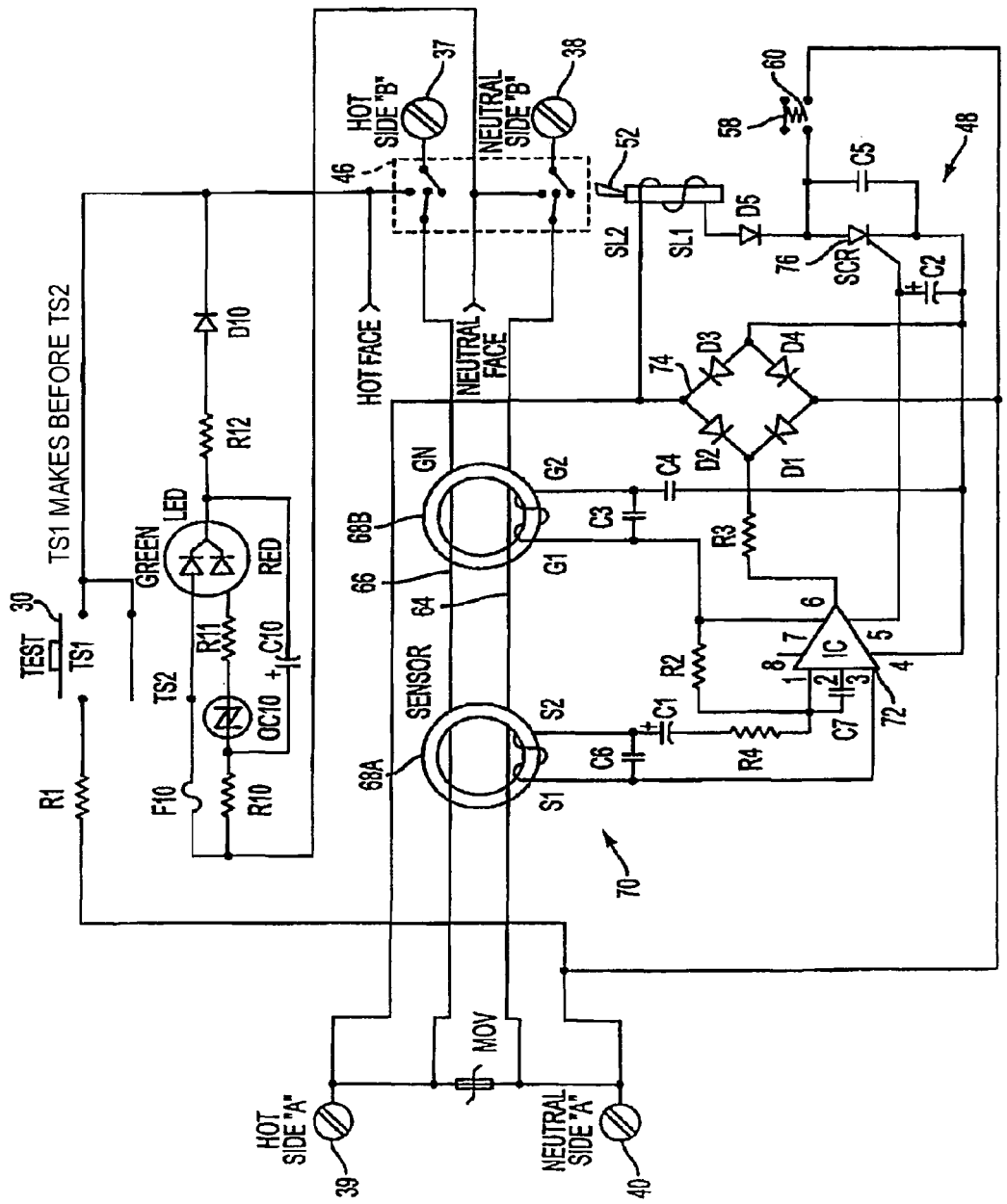
FIG. 11 is a schematic diagram illustrating an example of the circuitry of ground fault circuit interrupting device of FIG. 3 in accordance with an embodiment of the present invention.

FIG. 11 is a schematic diagram illustrating an example of the ground fault circuit interrupting device of FIG. 3 in accordance with another embodiment of the present invention. The GFCI receptacle 11 is similar in operation to the GFCI device 10 discussed above except GFCI receptacle 11 includes an alarm indicator 44, a test switch 30 having primary contacts TS1 and secondary contacts TS2. A detailed description of the operation of the test switch can be found in U.S. patent application Ser. No. 10/032,064, filed on Dec. 31, 2001 entitled "Ground Fault Circuit Interrupter (GFCI) With A Secondary Switch Contact Protection", which is incorporated herein by reference.

When test switch 30 is pressed and closes primary test switch contacts TS1, an imbalance is created. The latching mechanism 46 opens and the alarm indicator 44 is extinguished and no longer provides a green colored illumination. Since the latching mechanism 46 is open, the subsequent closing of secondary test switch contacts TS2 by test switch 30 has no affect on GFCI 11.

In contrast, if the closing of primary test switch contacts TS1 fails to trip the latching mechanism 46, secondary test switch contact TS2 causes a short circuit blowing the fuse F10 and extinguishing the alarm indicator 44 providing green illumination. However, the alarm indicator 44 illuminates red. Diode DC10, resistor R11 and capacitor together act to flash alarm indicator 44. The flashing alarm indicator 44 indicates to a user that GFCI 11 is not providing ground fault protection and is only operating as an unprotected receptacle and not as a GFCI. Alarm indicator 44 will only flash red when the latching mechanism fails to trip. Thus, the alarm indicator can also serve to provide an indication of a defective solenoid 50, or any other component of the GFCI that aids in tripping the latching mechanism 46.

Figure 12:
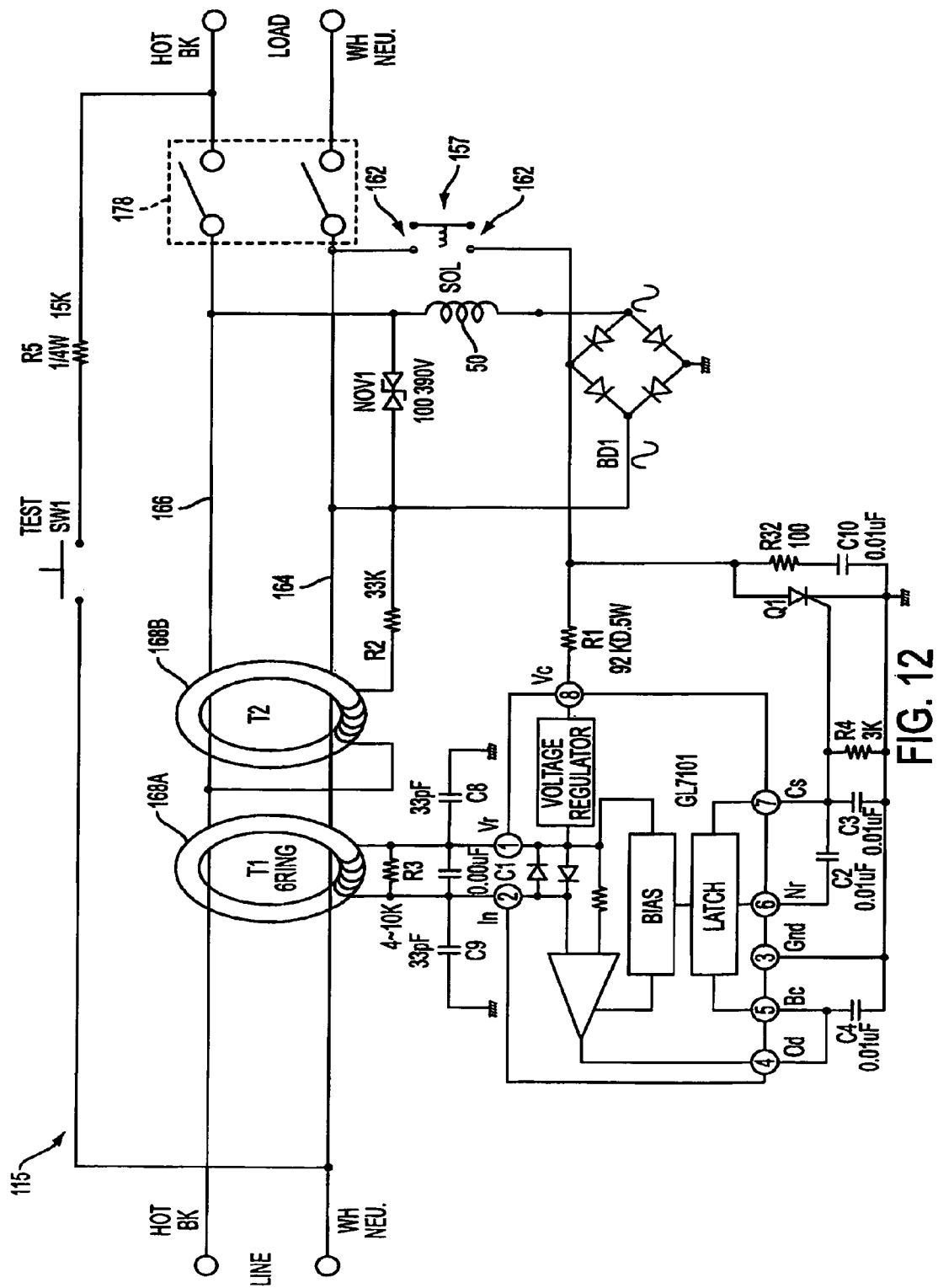
FIG. 12 is a schematic diagram of an example of a ground fault circuit interrupting (GFCI) device in accordance with another embodiment of the present invention.

FIG. 12 is a perspective view of an example of a ground fault circuit interrupting (GFCI) device in accordance with another embodiment of the present invention. The GFCI 115 does not contain isolated face terminals and performs ground fault detection in a manner known to those skilled in the art and will be discussed with reference to its novelty. The GFCI 115 includes latching plate 153 (See FIG. 13), secondary contacts 162 and a locking plate 157. Latching plate 153 is structured and arranged so that a portion of the latching plate passes through a plunger end 151 (See FIG. 13). The portion of the latching plate 153 passing through the plunger end 151 has a curved end. The curved end of the latching plate 153 allows the plunger end 151 to move the latching plate 153 laterally in the direction of "A" and "B". Proximate its center, latching plate 153 has an aperture 154 to allow reset pin 156 to engage with the latching plate 153 when the reset button 134 is depressed. In a reset prevention state, the latching plate 153 is positioned such that the reset pin 156 freely passes through the latching plate 153.

Locking plate 157 is used to place the GFCI 115 in a reset prevention state. The locking plate can be a pin type device, which is inserted through the aperture 142 during the manufacturing process between the plunger 151 and the secondary contacts 162, thus closing the secondary contacts 162. When the GFCI 115 is powered from the load side, there is no power to the solenoid 150. Therefore, the GFCI 115 remains in a reset prevention state because upper shoulder 149 of the reset pin 156 cannot latch with the bottom surface of the latching plate 153 and reset the GFCI 115. When the GFCI 115 is powered from the line side, the solenoid is powered and moves the plunger in the direction of "B" slightly misaligning the aperture 154 in the latching plate 153 with the reset pin 156, thus allowing the upper shoulder 149 of reset pin 156 to contact the lower surface of latching plate 153, and thus pull latch plate 153 and latch block 159 upward to close the contacts of latching mechanism 178 in a manner similar to that discussed with regard to latch plate 54 and latch block 63. The locking plate 157 falls and opens the secondary contacts 162, removing power from the solenoid 150.

Figure 13:
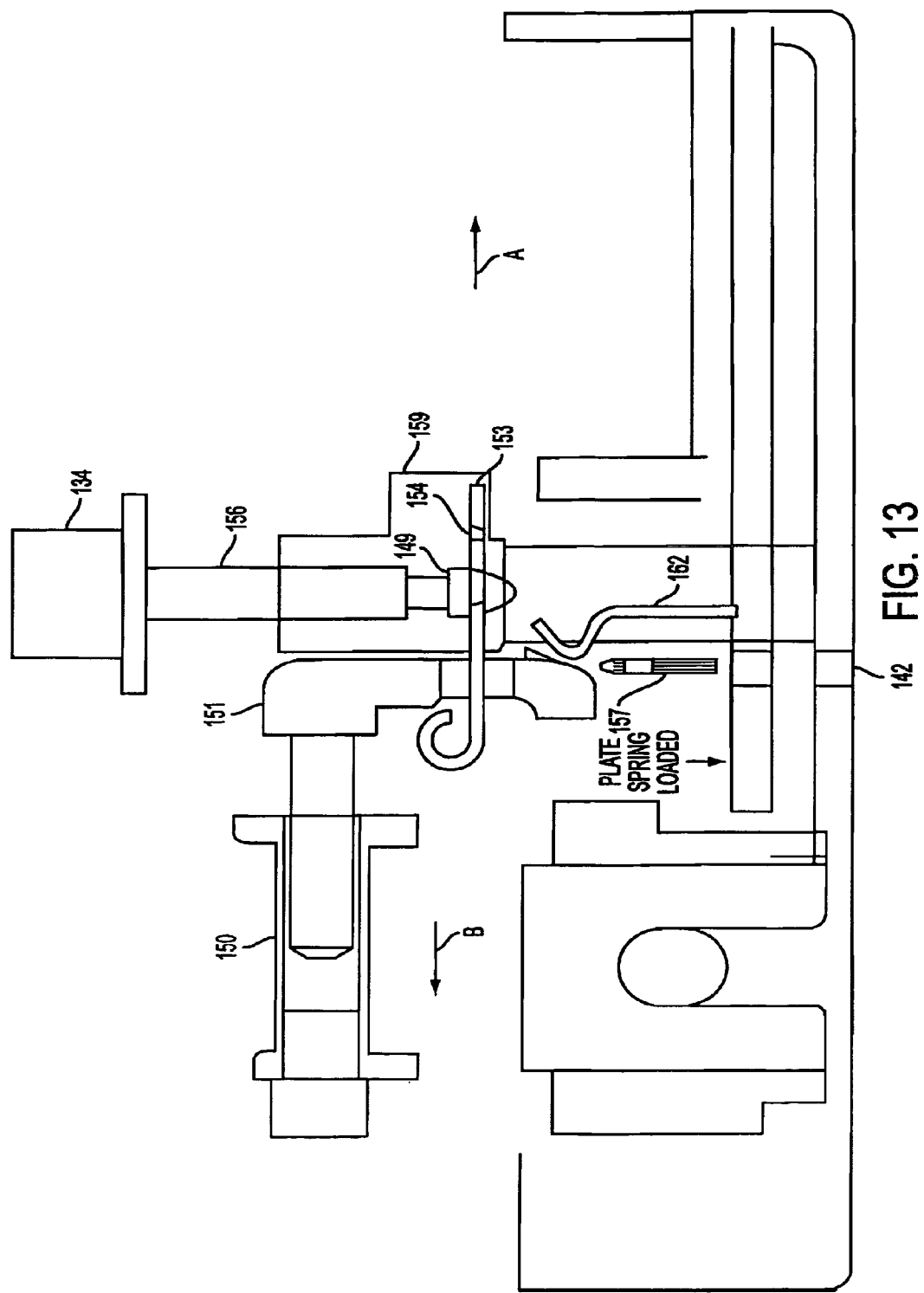
FIG. 13-16 are views illustrating examples of positions of a locking plate in the GFCI of FIG. 12 in accordance with an embodiment of the present invention.

This embodiment of the invention will now be discussed with reference to FIG. 13-16 which are views illustrating examples of positions of a locking plate in the GFCI of FIG. 12 in accordance with an embodiment of the present invention. In FIG. 13, secondary contacts 162 are open and the locking plate 157 is being inserted into the GFCI 115 via the aperture 142.

Figure 14:
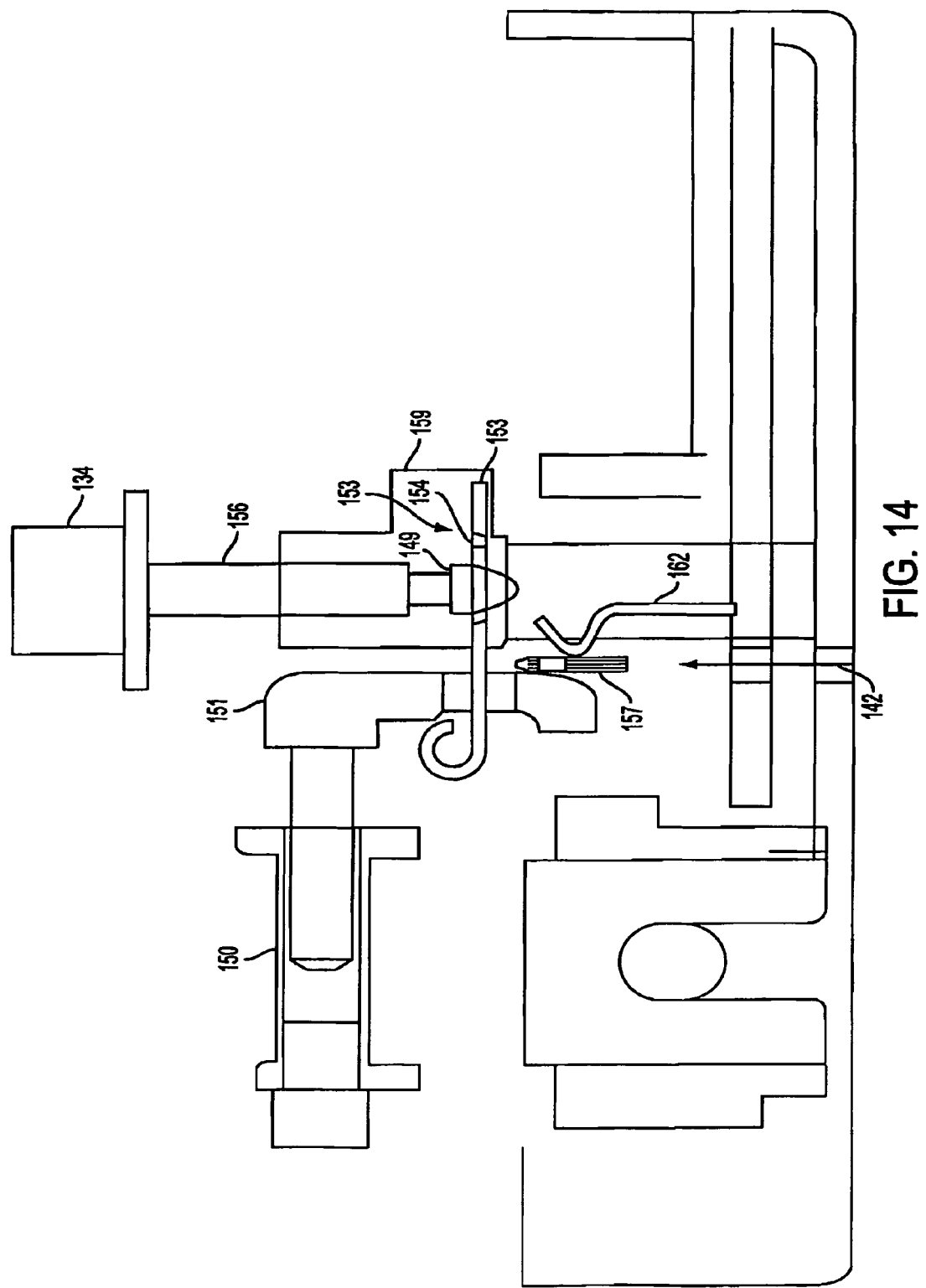

In FIG. 14, the locking plate 157 comprising a pin type device is inserted between the plunger 151 and the secondary contacts 162, thus closing the secondary contacts 162 and allowing the secondary contacts 162 to power the solenoid 150 if the GFCI 115 is wired from the line side. The latching plate 153, however, is positioned to allow the reset pin 156 to freely pass through the aperture 154 and thus not engage with the latching plate 153 unless the GFCI 115 is connected to the line side in a manner similar to that discussed above with regard to FIGS. 4-10.

Figure 15:
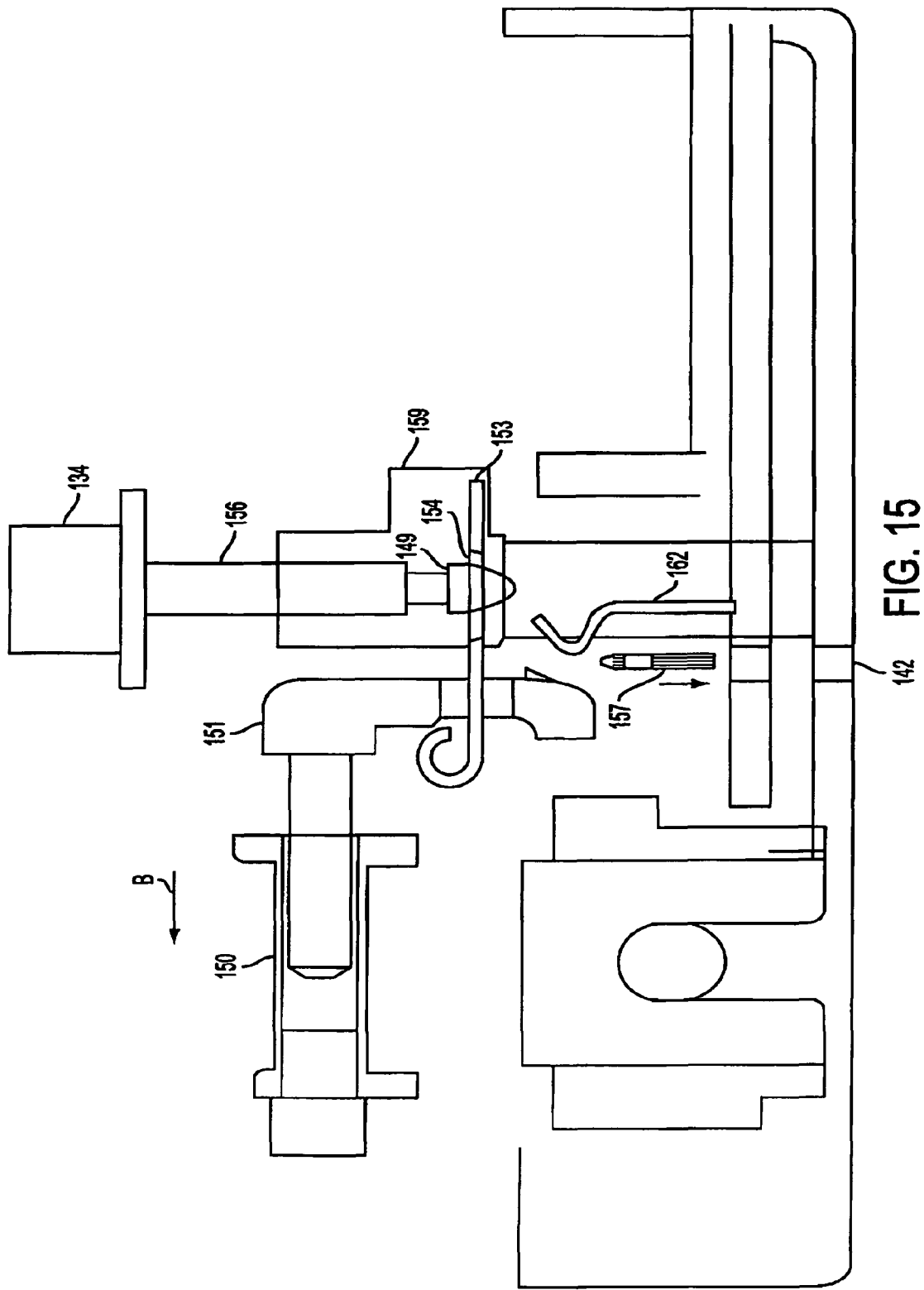
Figure 16:
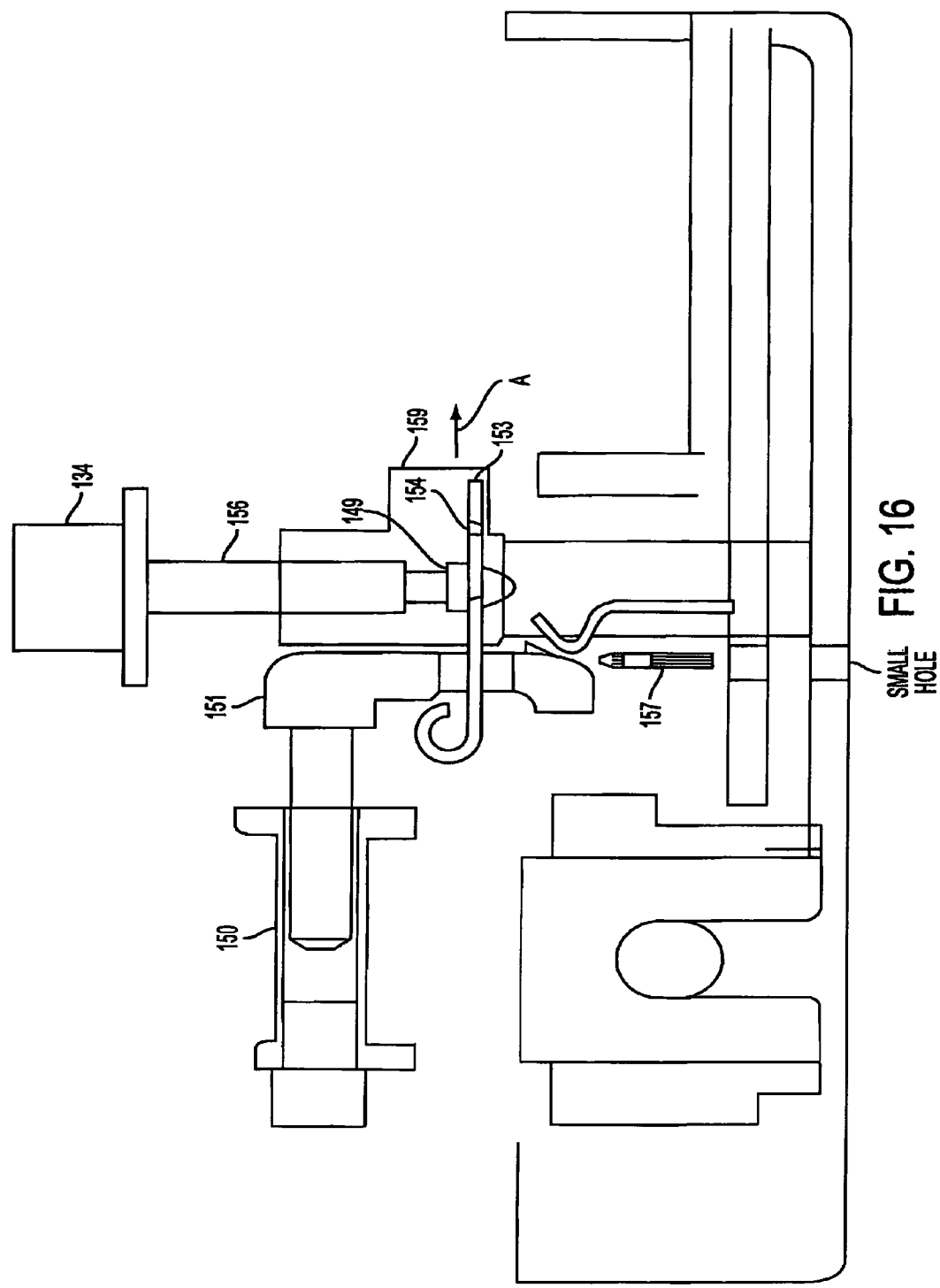

In FIG. 15, the GFCI 115 has been wired to the line side and the plunger 151 moves in the direction of "B" to release the locking plate 157. IN FIG. 16, the plunger 151 moves in the direction of "A" allowing an aperture in the latch plate 153 to be slightly misaligned with the reset pin 156 as shown in FIG. 16.

FIGS. 17A and 17B are cross sectional views illustrating examples of positions of an initial reset prevention arrangement that can be used with a GFCI in accordance with another embodiment of the present invention. For conciseness, the details of the reset button, and reset pin are not repeated here. In FIG. 17, the locking plate 182 comprises a vertical member 182A connected to a horizontal member 182B proximate the center of the horizontal member 182B. A locking spring 180 is disposed between a portion of the inner housing 113 and an end of the horizontal member 182B. The locking spring 180 exerts force on the horizontal member 182B in the direction of "C". An opposing end of the horizontal member 182B makes contact with secondary contacts 178 in order to close the secondary contacts 178. The locking plate 182 is shown in a non-initial reset prevention state. That is, the plunger end 151 does not retain the vertical member 182A of the locking plate 182 in a position in which the horizontal member 182B closes the secondary contacts 178 by making contact with the secondary contacts 178.

Referring now to FIG. 17B, the plunger end 151 is shown retaining the vertical member 182A of the locking plate 182 which enables the horizontal member 182B to close the secondary contacts 178. The latch plate 153 is positioned so that the end of the reset pin (not shown) can freely pass through the opening 154 as discussed above, to prevent resetting. As also discussed above, the locking spring 180 is compressed by an end of the vertical member 182 which exerts force in the direction of "C". When the GFCI is powered from the line side, the secondary contacts 178 power the solenoid 150 which results in the plunger 151 moving in the direction of "A", thus releasing the locking plate 182. Substantially simultaneously, the spring 180 exerts force on the horizontal member 182B to propel the horizontal member 182B in the direction of "C" and open the secondary contacts 178.

FIGS. 18A and 18B are cross sectional views illustrating examples of positions of a another initial reset prevention arrangement that can be used with a GFCI in accordance with an embodiment of the present invention. Referring to 18B, the solenoid 150 includes a plunger 184 having a vertical member 184A, a horizontal member 184B and an aperture 184C. The vertical member 184A is connected to the solenoid 150 and to a latching plate 186, which is similar to latching plate 153 discussed above. The horizontal member 184B is connected to the vertical member 184A. In an initial reset prevention state, the pin 191 of locking plate 190 is aligned with and passes through aperture 184C engages with the upper surface of horizontal member 184B, and thus closes the secondary contacts 192. In this position, an aperture 187 in the latching plate 186 is substantially aligned with a reset pin (not shown) to thus allow the reset pin to pass through the aperture 187. Thus, the reset pin cannot latch with the latching plate 186 and close the latching mechanism (not shown) to reset. The locking spring 188 is compressed and exerts force on the locking plate 190 in the direction of "C". However, the locking spring 188 cannot pull the locking plate 190 out of the aperture 184C unless the GFCI is powered from the line side.

Referring now to FIG. 18A, the GFCI has been wired to the line side. The secondary contacts 192 power the solenoid 150 moving the plunger 184 in the direction of "B". This movement releases the locking plate from aperture 184C. The locking spring 180 propels the locking plate 190 away from the aperture 184C and secondary contacts 192 to a position of rest as shown. The release of the locking plate 190 moves the latching plate 186 to slightly misalign the aperture 187 in the latching plate 186 with the reset pin. Thus, the reset pin can engage the latching plate 186 and reset the contacts to a closed state in a manner similar to that discussed above.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A protection device comprising:
    line, load and user accessible face terminals;
    a latching mechanism movable between a closed state providing electrical contact between said line, load and face terminals and an open state disconnecting electrical contact between said line, load and face terminals;
    a miswiring protection circuit adapted to open-circuit when power is applied to the line terminals; and
    an initial reset prevention mechanism movable between a first position preventing said latching mechanism from being set in said closed state and a second position permitting said latching mechanism to be set in said closed state when said miswiring protection circuit is open-circuited.

2. A protection device according to claim 1, further comprising an alarm indicator, providing an indication that the protection device is not providing ground fault protection.

3. A protection device according to claim 2, wherein said alarm indicator is a bicolor Light Emitting Diode (LED).

4. A protection device according to claim 3, wherein the LED flashes red to indicate the device is not providing ground fault protection.

5. A protection device according to claim 2, wherein said miswiring protection circuit is connected between a hot line terminal of the device and a neutral line terminal of the device.

6. A protection device according to claim 1, wherein said protection device is non-operational when powered from the load terminals prior to being powered from the line terminals.

7. A protection device according to claim 2, wherein said alarm indicator comprises a Light Emitting Diode (LED).

8. A protection device according to claim 2, wherein said alarm indicator comprises an audible indicator.

9. A method of preventing miswiring of a protection device having line, load and face terminals, the method comprising the steps of:
    moving a latching mechanism between a closed state establishing electrical contact between said line, load and face terminals, and an open state prevents electrical contact between said line, load and face terminals;
    conducting current in a miswiring protection circuit configured in a conductive path between a solenoid of the protection device and one of the line terminals;
    preventing said latching mechanism from remaining in said closed state when an initial reset prevention mechanism is in a first position;
    generating an open-circuit in said miswiring protection circuit when AC power is applied to the line terminals;
    moving the initial reset prevention mechanism to a second position when AC power is applied to the line terminals; and
    permitting said latching mechanism to be set in said closed state when the initial reset prevention mechanism is in the second position.

10. A method according to claim 9, further comprising:
    activating an alarm indicator when said protection device is not providing ground fault protection.

11. A method according to claim 10, wherein said alarm indicator is a bicolor Light Emitting Diode (LED).

12. A method according to claim 11, wherein the LED flashes red to indicate the device is not providing ground fault protection.

13. A method according to claim 10, wherein said alarm indicator comprises a Light Emitting Diode (LED).

14. A protection device comprising:
    phase line, load and face terminals;
    neutral line, load and face terminals;
    a latching mechanism movable between a closed state establishing one or more of electrical contact between said phase line, load and face terminals and electrical contact between said neutral line, load and face terminals, and an open state disconnecting one or more of electrical contact between said phase line, load and face terminals and disconnecting electrical contact between said neutral line, load and face terminals;
    the latching mechanism including,
    a first switch assembly being in a phase current path between the phase line and phase load terminals and having a first switch contact, a second switch contact, and third and fourth dual-switch contacts disposed between said first and second switch contacts for selectively opening or closing the phase current path, the first and second switch contacts and the third and fourth dual-switch contacts being aligned in a single axis, and
    a second switch assembly being in a neutral current path between the neutral line and neutral load terminals and having a fifth switch contact, a sixth switch contact, and seventh and eighth dual-switch contacts disposed between said fifth and sixth switch contacts for selectively opening or closing a second conductive path, the fifth and sixth switch contacts and the seventh and eighth dual-switch contacts being aligned in a single axis.

15. A protection device as claimed in claim 14, further comprising an alarm indicator, adapted to provide an indication that said protection device is not providing ground fault protection.

16. A protection device as claimed in claim 14, wherein said third and fourth dual-switch contacts comprise a first contact surface oriented along the single axis, and a second contact surface oriented in the opposite direction from said first surface along the single axis.

17. A protection device as claimed in claim 16, wherein said first and second contact surfaces are both part of a single unitary conductive contact structure attached to a movable end of a flexible conductive brush arm.

18. A protection device as claimed in claim 16, wherein the first contact surface of said third and forth dual-switch contacts faces the first switch contact of said first switch assembly and the second contact surface of said third and forth dual-switch contacts faces the second switch contact of said first switch assembly.

19. A protection device comprising:
hot line and load terminals;
neutral line and load terminals;
a sensor electrically coupled to the line and load terminals via a plurality of current paths, said sensor capable of detecting a difference in current flowing in the current paths and generate a current difference signal;
a fault detector electrically coupled to said sensor and operable to generate a fault signal based on the current difference signal;
a latching mechanism electrically coupling the line terminals and the load terminals in a reset state;
a miswiring protection circuit disposed between said hot line terminal and said neutral line terminal and including at least a solenoid and a switch such that current flowing through the solenoid when AC power is applied to the line terminals causes the switch to move to an open state; and
a miswire prevention mechanism operable to prevent said latching mechanism from maintaining the reset state when AC power is supplied to the load terminals.

20. The protection device as claimed in claim 19, further comprising a reset device, said reset device operable to place said latching mechanism into the reset state when AC power is supplied to the line terminals.

21. A ground fault circuit interrupter (GFCI) comprising:
a line terminal;
a load terminal;
a user accessible face terminal;
a resilient first cantilevered contact arm electrically connected to said line terminal at a fixed end of said first cantilevered contact arm and having a movable line electrical contact at a free end of said first cantilevered contact arm;
a resilient second cantilevered contact arm electrically connected to said load terminal at a fixed end of said second cantilevered contact arm and having a movable load electrical contact at a free end of said second cantilevered contact arm; and
a face electrical contact electrically connected to said user accessible face terminal, each of said load, line and face electrical contacts being substantially aligned along a common axis being electrically isolated from each other when the GFCI is in a tripped condition, and being electrically connected with each other when the GFCI is in a reset condition.

22. The GFCI recited in claim 21, wherein one of the line electrical contact and the load electrical contact is a dual-sided contact assembly having two contact surfaces located on opposite sides thereof, and
the other of the line and load contacts is a single-sided contact having a single contact surface located on one side of the respective electrical contact, and
a movable latch block engages at least one of said cantilevered contact arms to move the line electrical contact, the load electrical contact and the face electrical contact into electrical contact.

23. The GFCI recited in claim 22, wherein the respective electrical contact having said two contact surfaces comprises a single unitary conductive contact body.

24. The GFCI recited in claim 22, wherein a reset assembly including a user accessible reset button resets the GFCI.

25. The GFCI recited in claim 22, further comprising a current interrupting device configured to cause an open circuit condition when AC power is applied to said line terminal.

26. The GFCI recited in claim 25, wherein said current interrupting device includes a spring loaded conductive member in electrical contact with two opposing circuit contact points prior to AC power being applied to said line terminal and electrically disconnecting the two contact points when AC power is applied to said line terminal.

27. The GFCI recited in claim 22, further comprising a reset prevention mechanism that prevents the GFCI device from remaining in the reset condition until AC power has been applied to said line terminal.

28. The GFCI recited in claim 21, further comprising a wiring detection circuit generating an open circuit condition when the source of AC power is supplied to said line terminal.

29. A ground fault circuit interrupter (GFCI) comprising:
a housing;
at least one line terminal at least partially disposed within said housing;
at least one load terminal at least partially disposed within said housing;
at least one user accessible face terminal at least partially disposed within said housing;
a first flexible contact arm electrically connected to said line terminal at a first fixed end of said first flexible contact arm and having a line electrical contact adjacent a first free end of said first flexible contact arm;
a second flexible contact arm electrically connected to said load terminal at a second fixed end of said second flexible contact arm and having a load electrical contact adjacent a second free end of said second flexible contact arm; and
a face electrical contact electrically connected to said user accessible face terminal, said face electrical contact, said line electrical contact and said load electrical contact being substantially aligned along a common axis, said line electrical contact and said load electrical contact being movable along said common axis between a first position in which said line, load and face electrical contacts are electrically connected and a second position in which said line, load and face electrical contacts are spaced and electrically isolated from one another.

30. The GFCI recited in claim 29, wherein said at least one line terminal comprises a phase line terminal and a neutral line terminal, said at least one load terminal comprises a phase load terminal and a neutral load terminal and said at least one user accessible face terminal comprises a phase user accessible face terminal and a neutral user accessible face terminal.

31. The GFCI recited in claim 29, wherein,
said face electrical contact comprises a single contact surface facing the line and load electrical contacts;
one of the load electrical contact and the line electrical contact comprises a single contact surface facing said face electrical contact; and
the other of the load electrical contact and the line electrical contact includes two oppositely facing contact surfaces facing the face electrical contact and the one of the load and line electrical contacts, respectively.

32. The GFCI recited in claim 31, wherein,
the oppositely facing contact surfaces are on a single electrically conductive member connected to the respective flexible contact arm.

33. The GFCI recited in claim 29, wherein at least one of said first and second flexible contact anus comprises a vertical attachment portion at the fixed end thereof which is fixed to one of said line and load terminals, and a flexible portion disposed substantially perpendicular to said attachment portion.

34. The GFCI recited in claim 33, wherein said flexible portion comprises at least one bend such that the flexible portion is nonplanar.

35. A ground fault circuit interrupter (GFCI) comprising:
a housing;
phase and neutral line terminals at least partially disposed within said housing and connected to a source of AC power;
phase and neutral load terminals at least partially disposed within said housing and connected to a first electrical load;
phase and neutral user accessible face terminals at least partially disposed within said housing;
phase and neutral first flexible conductive contact arms having first ends being fixedly connected to said phase and neutral line terminals, respectively, and second ends each having a respective first electrical contact connected adjacent a respective free end thereof;
phase and neutral second flexible conductive contact arms having first ends being fixedly connected to said phase and neutral load terminals, respectively, and the second ends each having a respective second electrical contact adjacent a respective free end thereof; and
phase and neutral face electrical contacts electrically respectively connected to said phase and neutral user accessible face terminals and aligned substantially along phase and neutral axes with the respective first and second electrical contacts, the first and second contacts being movable along the respective axes between first positions in which the respective face, line and load electrical contacts are electrically connected and second positions in which the respective face, line and load contacts are spaced and electrically isolated from one another.

36. The GFCI recited in claim 35 further comprising:
a reset assembly at least partially disposed within said housing and including a reset pin;
a latch plate engaging at least the reset pin; and
a latch block assembly engaging at least one of said phase and neutral first flexible conductive contact arms and said phase and neutral second flexible conductive contact arms and said latch plate,
whereby when said reset assembly is activated the reset pin engages said latch plate and moves said latch block assembly towards each of said flexible contact arms such that the phase first electrical contact and the phase second electrical contact are moved to contact the phase face electrical contact, and the neutral first electrical contact and the neutral second electrical contact are moved to contact the neutral face electrical contact.

* * * * *

UNITED STATES PATENT AND TRADEMARK OFFICE
CERTIFICATE OF CORRECTION

PATENT NO. : 7,889,465 B2
APPLICATION NO. : 12/385394
DATED : February 15, 2011
INVENTOR(S) : Nelson Bonilla et al.

It is certified that error appears in the above-identified patent and that said Letters Patent is hereby corrected as shown below:

Col. 12, Ln. 20, please change the word "prevents" to the word "preventing"

Col. 15, Ln. 19, please change the word "anus" to the word "arms"

Signed and Sealed this
Tenth Day of May, 2011

David J. Kappos
*Director of the United States Patent and Trademark Office*